(12) United States Patent
Kawamoto

(10) Patent No.: US 11,228,688 B2
(45) Date of Patent: Jan. 18, 2022

(54) INFORMATION PROCESSING SYSTEM FOR SUPPORTING CREATION OF PROPOSAL DOCUMENTS AND NON-TRANSITORY COMPUTER READABLE MEDIUM STORING PROGRAM

(71) Applicant: FUJIFILM Business Innovation Corp., Tokyo (JP)

(72) Inventor: Shinji Kawamoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 214 days.

(21) Appl. No.: 16/354,235

(22) Filed: Mar. 15, 2019

(65) Prior Publication Data
US 2019/0327372 A1 Oct. 24, 2019

(30) Foreign Application Priority Data

Apr. 18, 2018 (JP) .............................. JP2018-080242

(51) Int. Cl.
*H04N 1/00* (2006.01)
*G06Q 30/02* (2012.01)

(52) U.S. Cl.
CPC ..... *H04N 1/00442* (2013.01); *G06Q 30/0201* (2013.01); *H04N 1/00129* (2013.01); *H04N 1/00395* (2013.01); *H04N 1/00424* (2013.01); *H04N 1/00427* (2013.01); *H04N 1/00432* (2013.01); *H04N 2201/0094* (2013.01)

(58) Field of Classification Search
CPC ........... H04N 1/00442; H04N 1/00432; H04N 1/00427; H04N 1/00424; H04N 1/00129; H04N 2201/0094; H04N 1/2166; H04N 1/2179; H04N 1/2183; H04N 1/2187; G06F 17/30165; G06F 17/30126
USPC ....................................................... 358/1.15
See application file for complete search history.

(56) References Cited

U.S. PATENT DOCUMENTS

| | | | |
|---|---|---|---|
| 2008/0151300 A1* | 6/2008 | Kowaka | G06F 40/106 358/1.15 |
| 2010/0033753 A1* | 2/2010 | Stephenson | H04N 1/4446 358/1.15 |

FOREIGN PATENT DOCUMENTS

| | | |
|---|---|---|
| JP | 2006159617 | 6/2006 |
| JP | 2014123238 | 7/2014 |

* cited by examiner

*Primary Examiner* — Kent Yip
(74) *Attorney, Agent, or Firm* — JCIPRNET

(57) ABSTRACT

An information processing system includes: an image display section that includes a screen on which an image is displayed; a reception image display unit that is able to display plural reception images for respectively receiving an instruction for execution of a predetermined process on the screen; and a process execution unit that executes, in a case where an operation with respect to a first reception image among the plural reception images is received from a user, the process with respect to a second reception image that is associated with the first reception image among the plural reception images and is not displayed on the screen on which the first reception image is displayed.

17 Claims, 22 Drawing Sheets

FIG. 4

| COMPANY NAME | COMPANY CODE | BUSINESS TYPE | CONTRACT DIVISION NAME | SALES REPRESENTATIVE NAME | SALES REPRESENTATIVE CODE | ... | CONTRACT PRODUCT ID | | | | 110 |
|---|---|---|---|---|---|---|---|---|---|---|---|
| | | | | | | | SERVER | MULTI-FUNCTION PRINTER | NETWORK DEVICE | CLOUD SERVICE | |
| ... | ... | ... | ... | ... | ... | ... | ... | ... | ... | ... | |
| A CORPORATION | K-08443 | RETAILING | GENERAL AFFAIRS DEPARTMENT | HANAKO FUJI | E21841 | ... | SV-10856 | MF-48512 | | | |
| B CORPORATION | K-08444 | MANUFACTURING | GENERAL AFFAIRS DEPARTMENT | ICHIRO FUJI | E40213 | ... | SV-28103 | MF-21356 | - | CS-02815 | |
| C CORPORATION | K-08445 | RETAILING | GENERAL AFFAIRS DEPARTMENT | TARO FUJI | E54461 | ... | SV-70315 | MF-67042 | NW-56173 | CS-18141 | |
| D CORPORATION | K-08446 | CONSTRUCTION | BUSINESS DEPARTMENT | TARO FUJI | E54461 | ... | SV-50382 | MF-28061 | - | | |
| E CORPORATION | K-08446 | MANUFACTURING | GENERAL AFFAIRS DEPARTMENT | ICHIRO FUJI | E40213 | ... | - | MF-41370 | NW-41762 | CS-45037 | |
| ... | ... | ... | ... | ... | ... | ... | ... | ... | ... | ... | |

FIG. 5

| PROPOSAL DOCUMENT CONFIGURATION ID | PRODUCT TYPE | BUSINESS TYPE | NUMBER OF CONTENT CONFIGURATIONS | PROPOSAL DOCUMENT CONFIGURATION INFORMATION ||||||||||||
|---|---|---|---|---|---|---|---|---|---|---|---|---|---|---|
| | | | | CONTENT 1 || CONTENT 2 || CONTENT 3 || CONTENT 4 || CONTENT 5 || CONTENT 6 ||
| ... | ... | ... | ... | ... | ... | ... | ... | ... | ... | ... | ... | ... | ... | ... |
| ST-10011 | MULTI-FUNCTION PRINTER | MANUFACTURING | 6 | CONTENT NAME: COVER | CONTENT ID: FC-002 | CONTENT NAME: CONTENTS | CONTENT ID: TC-001 | CONTENT NAME: INDUSTRY TRENDS | CONTENT ID: TR-001 | CONTENT NAME: PRODUCT INFORMATION | CONTENT ID: PR-101 | CONTENT NAME: PRODUCT CASE EXAMPLE INFORMATION | CONTENT ID: EX-101 | CONTENT NAME: CONCLUSION | CONTENT ID: SU-002 |
| ST-10211 | SERVER | MANUFACTURING | 6 | CONTENT NAME: COVER | CONTENT ID: FC-002 | CONTENT NAME: CONTENTS | CONTENT ID: TC-001 | CONTENT NAME: INDUSTRY TRENDS | CONTENT ID: TR-001 | CONTENT NAME: PRODUCT INFORMATION | CONTENT ID: PR-102 | CONTENT NAME: PRODUCT CASE EXAMPLE INFORMATION | CONTENT ID: EX-102 | CONTENT NAME: CONCLUSION | CONTENT ID: SU-002 |
| ST-10311 | NETWORK DEVICE | MANUFACTURING | 6 | CONTENT NAME: COVER | CONTENT ID: FC-002 | CONTENT NAME: CONTENTS | CONTENT ID: TC-001 | CONTENT NAME: INDUSTRY TRENDS | CONTENT ID: TR-001 | CONTENT NAME: PRODUCT INFORMATION | CONTENT ID: PR-103 | CONTENT NAME: PRODUCT CASE EXAMPLE INFORMATION | CONTENT ID: EX-103 | CONTENT NAME: CONCLUSION | CONTENT ID: SU-002 |
| ST-10411 | CLOUD SERVICE | MANUFACTURING | 6 | CONTENT NAME: COVER | CONTENT ID: FC-002 | CONTENT NAME: CONTENTS | CONTENT ID: TC-001 | CONTENT NAME: INDUSTRY TRENDS | CONTENT ID: TR-001 | CONTENT NAME: PRODUCT INFORMATION | CONTENT ID: PR-104 | CONTENT NAME: PRODUCT CASE EXAMPLE INFORMATION | CONTENT ID: EX-104 | CONTENT NAME: CONCLUSION | CONTENT ID: SU-002 |
| ... | ... | ... | ... | ... | ... | ... | ... | ... | ... | ... | ... | ... | ... | ... |

| CONTENT ID | CONTENT NAME | CONTENT CLASSIFICATION | CASE EXAMPLE TYPE | BUSINESS TYPE | EMBEDDING INFORMATION | | TITLE |
|---|---|---|---|---|---|---|---|
| | | | | | TYPE | DATA | |
| ⋮ | ⋮ | ⋮ | ⋮ | ⋮ | ⋮ | ⋮ | ⋮ |
| FC-001 | COVER | COMMON PART | COMMON | COMMON | INPUT INFORMATION PRODUCT INFORMATION | PROPOSAL DATE PRODUCT INFORMATION | PRODUCT PROPOSAL DOCUMENT-COVER (GENERAL PURPOSE) |
| FC-002 | COVER | COMMON PART | COMMON | COMMON | CUSTOMER INFORMATION INPUT INFORMATION PRODUCT INFORMATION | COMPANY NAME PROPOSAL DATE PRODUCT INFORMATION | PRODUCT PROPOSAL DOCUMENT- COVER (FOR EACH CUSTOMER) |
| ⋮ | ⋮ | ⋮ | ⋮ | ⋮ | ⋮ | ⋮ | ⋮ |
| TC-001 | CONTENTS | COMMON PART | COMMON | COMMON | - | - | PRODUCT PROPOSAL DOCUMENT-CONTENTS (GENERAL PURPOSE) |
| ⋮ | ⋮ | ⋮ | ⋮ | ⋮ | ⋮ | ⋮ | ⋮ |
| TR-001 | INDUSTRY TRENDS | COMMON PART | COMMON | MANUFACTURING | CUSTOMER INFORMATION | BUSINESS TYPE | INDUSTRY TRENDS (MANUFACTURING) |
| TR-002 | INDUSTRY TRENDS | COMMON PART | COMMON | CONSTRUCTION | CUSTOMER INFORMATION | BUSINESS TYPE | INDUSTRY TRENDS (CONSTRUCTION) |
| TR-003 | INDUSTRY TRENDS | COMMON PART | COMMON | RETAILING | CUSTOMER INFORMATION | BUSINESS TYPE | INDUSTRY TRENDS (RETAILING) |
| ⋮ | ⋮ | ⋮ | ⋮ | ⋮ | ⋮ | ⋮ | ⋮ |
| PR-101 | PRODUCT INFORMATION | PRODUCT-SPECIFIC PART | MULTI-FUNCTION PRINTER | COMMON | PRODUCT INFORMATION | PRODUCT INFORMATION | PRODUCT INFORMATION (MULTI-FUNCTION PRINTER) |
| PR-102 | PRODUCT INFORMATION | PRODUCT-SPECIFIC PART | SERVER | COMMON | PRODUCT INFORMATION | PRODUCT INFORMATION | PRODUCT INFORMATION (SERVER) |
| PR-103 | PRODUCT INFORMATION | PRODUCT-SPECIFIC PART | NETWORK DEVICE | COMMON | PRODUCT INFORMATION | PRODUCT INFORMATION | PRODUCT INFORMATION (NETWORK DEVICE) |
| PR-104 | PRODUCT INFORMATION | PRODUCT-SPECIFIC PART | CLOUD SERVICE | COMMON | PRODUCT INFORMATION | PRODUCT INFORMATION | PRODUCT INFORMATION (CLOUD SERVER) |
| ⋮ | ⋮ | ⋮ | ⋮ | ⋮ | ⋮ | ⋮ | ⋮ |
| EX-101 | PRODUCT CASE EXAMPLE INFORMATION | PRODUCT-SPECIFIC PART | MULTI-FUNCTION PRINTER | COMMON | PRODUCT CASE EXAMPLE INFORMATION | CASE EXAMPLE INFORMATION | INTRODUCTION CASE EXAMPLE INFORMATION (MULTI-FUNCTION PRINTER) |
| EX-102 | PRODUCT CASE EXAMPLE INFORMATION | PRODUCT-SPECIFIC PART | SERVER | COMMON | PRODUCT CASE EXAMPLE INFORMATION | CASE EXAMPLE INFORMATION | INTRODUCTION CASE EXAMPLE INFORMATION (SERVER) |
| EX-103 | PRODUCT CASE EXAMPLE INFORMATION | PRODUCT-SPECIFIC PART | NETWORK DEVICE | COMMON | PRODUCT CASE EXAMPLE INFORMATION | CASE EXAMPLE INFORMATION | INTRODUCTION CASE EXAMPLE INFORMATION (NETWORK DEVICE) |
| EX-104 | PRODUCT CASE EXAMPLE INFORMATION | PRODUCT-SPECIFIC PART | CLOUD SERVICE | COMMON | PRODUCT CASE EXAMPLE INFORMATION | CASE EXAMPLE INFORMATION | INTRODUCTION CASE EXAMPLE INFORMATION (CLOUD SERVICE) |
| ⋮ | ⋮ | ⋮ | ⋮ | ⋮ | ⋮ | ⋮ | ⋮ |
| EX-201 | PRODUCT CASE EXAMPLE INFORMATION | PRODUCT-SPECIFIC PART | COMBINATION | COMMON | PRODUCT CASE EXAMPLE INFORMATION | CASE EXAMPLE INFORMATION | INTRODUCTION INFORMATION (MULTI-FUNCTION PRINTER + SERVER) |
| EX-202 | PRODUCT CASE EXAMPLE INFORMATION | PRODUCT-SPECIFIC PART | COMBINATION | COMMON | PRODUCT CASE EXAMPLE INFORMATION | CASE EXAMPLE INFORMATION | INTRODUCTION CASE CASE EXAMPLE INFORMATION (MULTI-FUNCTION PRINTER + CLOUD SERVICE) |
| ⋮ | ⋮ | ⋮ | ⋮ | ⋮ | ⋮ | ⋮ | ⋮ |
| SU-001 | CONCLUSION | COMMON PART | COMMON | COMMON | - | - | PRODUCT PROPOSAL DOCUMENT-CONCLUSION (GENERAL PURPOSE) |
| SU-002 | CONCLUSION | COMMON PART | COMMON | COMMON | CUSTOMER INFORMATION CUSTOMER INFORMATION | COMPANY NAME SALES REPRESENTATIVE NAME | PRODUCT PROPOSAL DOCUMENT-CONCLUSION (FOR EACH CUSTOMER) |
| ⋮ | ⋮ | ⋮ | ⋮ | ⋮ | ⋮ | ⋮ | ⋮ |

| (MULTI-FUNCTION PRINTER) CONTRACT PRODUCT ID | PRODUCT TYPE | NUMBER OF CONTRACTS | ... | DIAGNOSIS SCORE |
|---|---|---|---|---|
| ⋮ | ⋮ | ⋮ | ⋮ | ⋮ |
| MF-21354 | MULTI-FUNCTION PRINTER | 2 | ... | 4.7 |
| MF-21355 | MULTI-FUNCTION PRINTER | 3 | ... | 3.5 |
| MF-21356 | MULTI-FUNCTION PRINTER | 2 | ... | 3.6 |
| MF-21357 | MULTI-FUNCTION PRINTER | 6 | ... | 4.6 |
| MF-21358 | MULTI-FUNCTION PRINTER | 4 | ... | 4.1 |
| ⋮ | ⋮ | ⋮ | ⋮ | ⋮ |

| (CLOUD) CONTRACT PRODUCT ID | PRODUCT TYPE | NUMBER OF CONTRACTS | ... | DIAGNOSIS SCORE |
|---|---|---|---|---|
| ⋮ | ⋮ | ⋮ | ⋮ | ⋮ |
| CS-02813 | CLOUD | 10 | ... | 4.2 |
| CS-02815 | CLOUD | 20 | ... | 3.5 |
| CS-02816 | CLOUD | 10 | ... | 3.8 |
| CS-02819 | CLOUD | 10 | ... | 4.2 |
| CS-02820 | CLOUD | 30 | ... | 3.7 |
| ⋮ | ⋮ | ⋮ | ⋮ | ⋮ |

| CONDITION ID | TARGET ITEM | REQUEST SCORE |
|---|---|---|
| DI-101 | SERVER DIAGNOSIS SCORE | 4.2 |
| DI-102 | MULTI-FUNCTION PRINTER DIAGNOSIS SCORE | 4.0 |
| DI-103 | NETWORK DEVICE DIAGNOSIS SCORE | 3.8 |
| DI-104 | CLOUD SERVICE DIAGNOSIS SCORE | 4.0 |
| ⋮ | ⋮ | ⋮ |

145

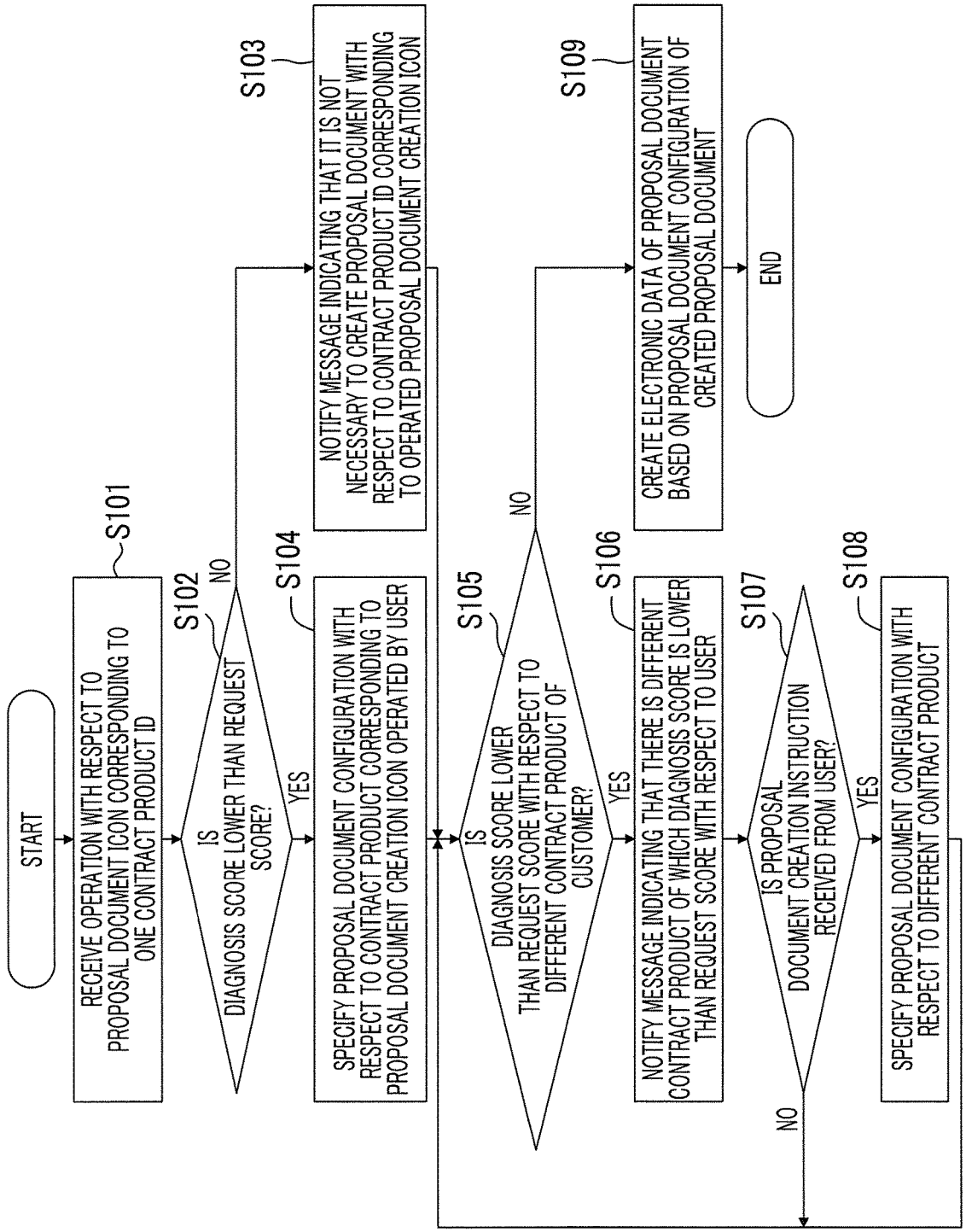

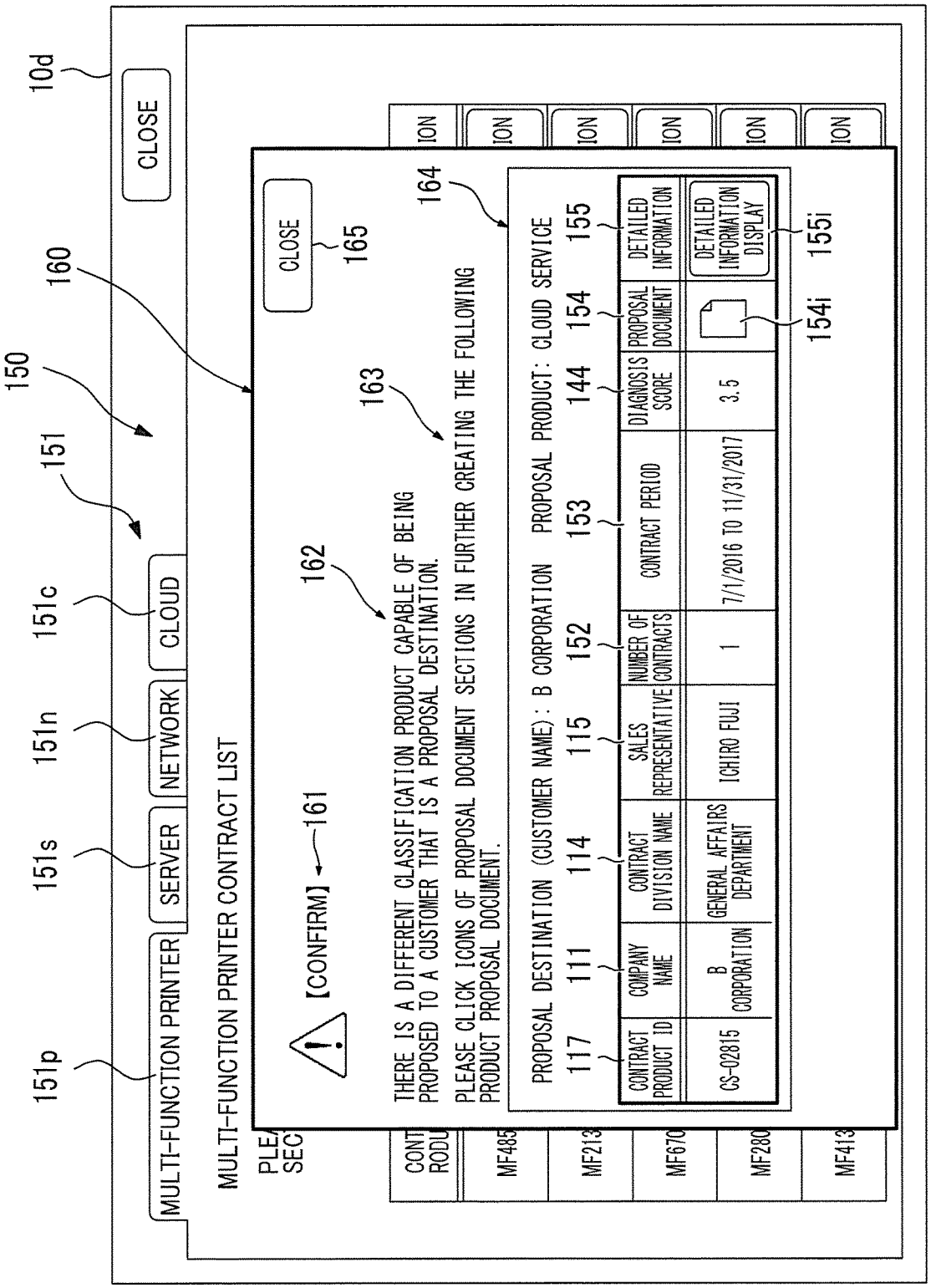

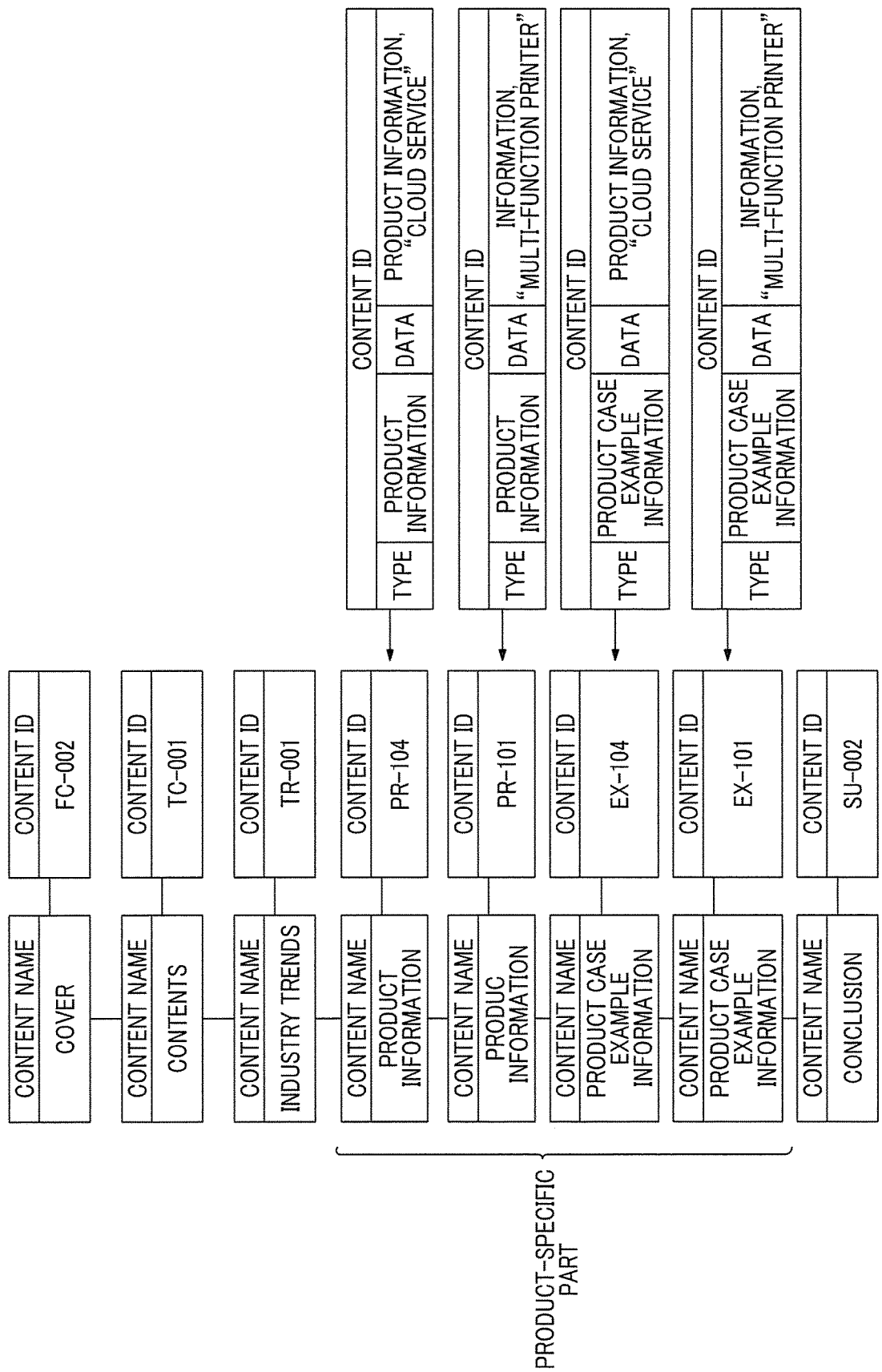

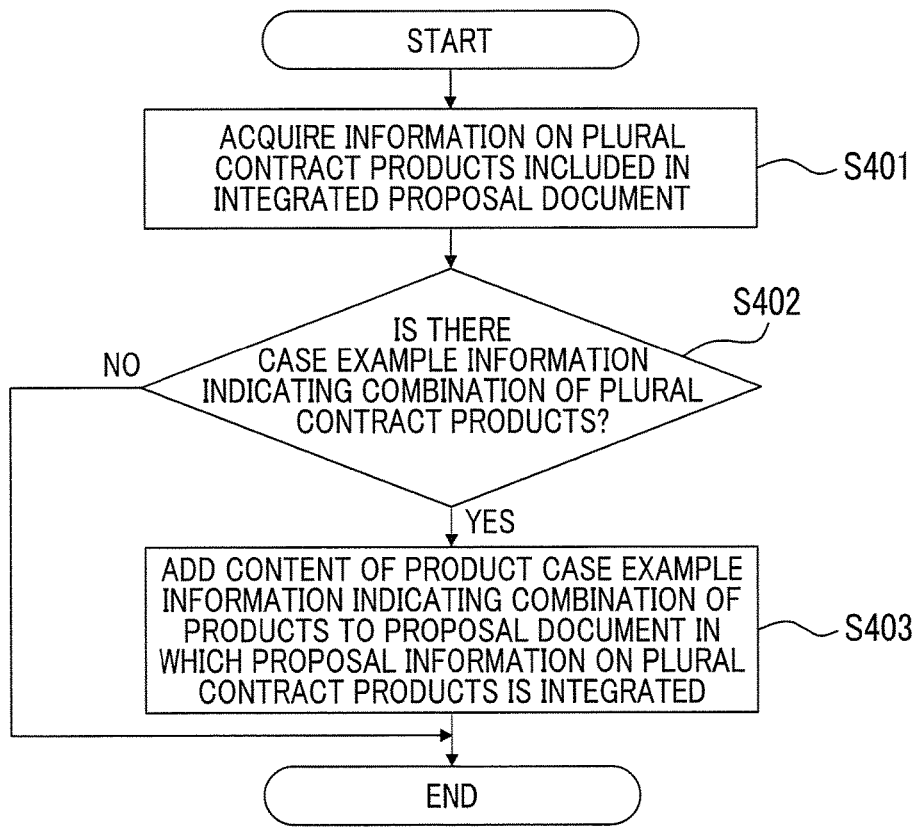

INFORMATION PROCESSING SYSTEM FOR SUPPORTING CREATION OF PROPOSAL DOCUMENTS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-080242 filed Apr. 18, 2018.

BACKGROUND

(i) Technical Field

The present invention relates to an information processing system and a non-transitory computer readable medium storing a program.

(ii) Related Art

JP2014-123238A discloses an information processing apparatus that includes a storage unit that stores information on predetermined items of a user profile relating to a customer and plural material files including a predetermined material file in association. Here, a CPU selects a corresponding material file from the plural material files stored in the storage unit on the basis of information on a predetermined item in a user profile of a target customer. Further, the CPU creates a material file to be presented to the customer on the basis of a predetermined material file and the selected material file. In addition, the CPU rewrites details of the predetermined material file before creation or after creation of the material file to be presented to the customer on the basis of the user profile of the target customer.

SUMMARY

In a case where a user uses a system that executes a predetermined process as a reception image displayed on a screen is operated, there is a case where the user wants to perform an instruction for execution of a process relating to a specific reception image and an instruction for execution of a process relating to a different reception image that is associated with the specific reception image but is not displayed on a screen on which the specific reception image is displayed. In such a case, it is necessary for the user to perform an operation with respect to the specific reception image, to perform a display operation for displaying the different reception image on the screen, and in this state, to perform an operation with respect to a further different reception image. Accordingly, in a case where the user wants to perform operations with respect to associated plural reception images, it takes time and effort for the user to perform the operations.

Aspects of non-limiting embodiments of the present disclosure relate to a technique that reduces, in a case where an operation with respect to plural associated reception images is to be performed, labor for the operation.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the present disclosure, there is provided an information processing system including: an image display section that includes a screen on which an image is displayed; a reception image display unit that is able to display a plurality of reception images for respectively receiving an instruction for execution of a predetermined process on the screen; and a process execution unit that executes, in a case where an operation with respect to a first reception image among the plurality of reception images is received from a user, the process with respect to a second reception image that is associated with the first reception image among the plurality of reception images and is not displayed on the screen on which the first reception image is displayed.

BRIEF DESCRIPTION OF THE DRAWINGS

Exemplary embodiment(s) of the present invention will be described in detail based on the following figures, wherein:

FIG. 4 is a diagram showing an example of a customer management table according to an exemplary embodiment;

FIG. 5 is a diagram showing an example of a proposal information management table according to an exemplary embodiment;

FIG. 6 is a diagram showing an example of a content information management table according to an exemplary embodiment;

FIGS. 7A and 7B are diagrams showing an example of creation of a cover in a proposal document, in which FIG. 7A shows a content material corresponding to the cover, for example;

FIGS. 9A and 9B are diagrams showing different examples of management images according to an exemplary embodiment;

FIGS. 10A, 10B, and 10O are diagrams showing examples of a diagnosis score table and a condition score table according to an exemplary embodiment;

FIG. 11 is a flowchart showing a processing flow of a proposal document creation process in an information processing system;

FIG. 12 is a diagram showing an example of a notification image according to an exemplary embodiment;

FIG. 16 is a diagram showing a configuration example of a proposal document in a case where proposal information on plural contract products is integrated;

FIG. 17 is a flowchart showing a flow of creation of combination proposal information on plural products according to an exemplary embodiment;

FIG. 18 is a diagram showing combination reference information on plural contract products;

DETAILED DESCRIPTION

Hereinafter, an exemplary embodiment of the present invention will be described in detail with reference to the accompanying drawings.

Information Processing System 1

Figure 1:
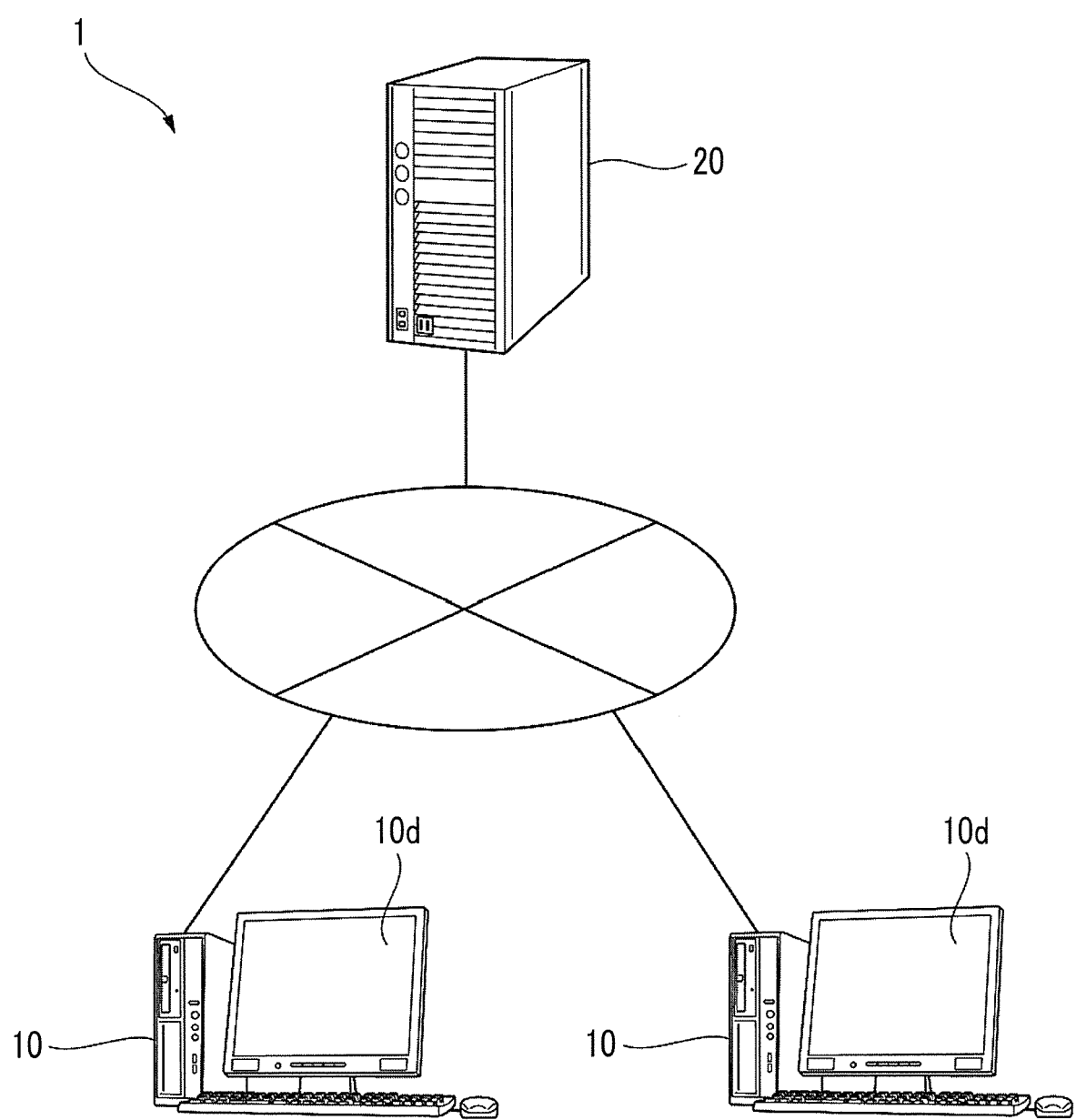
FIG. 1 is an overall diagram showing an example of an information processing system according to an exemplary embodiment.

FIG. 1 is an overall diagram showing an example of an information processing system 1 according to an exemplary embodiment.

As shown in FIG. 1, the information processing system 1 according to the exemplary embodiment includes a terminal 10 that is provided with a screen 10d and performs information processing, and a server 20 that performs information communication with at least the terminal 10 and performs information processing. Further, in the information processing system 1, the terminal 10 and the server 20 are able to mutually perform information communication through a network.

The network is not particularly limited, and may be any communication network used for data communication between respective devices. For example, the network may be a local area network (LAN), a wide area network (WAN), the internet, or the like. A communication line used for data communication may employ a wired manner or a wireless manner, or a combination thereof. Further, the respective devices may be connected to each other through plural networks or communication lines using a relay such as a gateway device or a router.

Further, in the example shown in FIG. 1, one server 20 is shown, but the server 20 is not limited to a single server machine. The server 20 may be divided into plural server machines provided on a network to realize functions of the server 20 (a so-called cloud environment, or the like).

Further, in the example shown in FIG. 1, two terminals 10 are shown as plural terminals 10, but three or more terminals 10 may be connected.

In the following description, an example in which the information processing system 1 is applied to a system used in supporting creation of a proposal document in a case where with respect to a contract company (hereinafter, referred to as a customer) for which a contract such as a sales contract or a lease contract of products is performed from the sales company, a sales representative (hereinafter, referred to as a user) of a sales company that sells products (including objects or services) performs a proposal to the customer after the contract is used.

Figure 2:
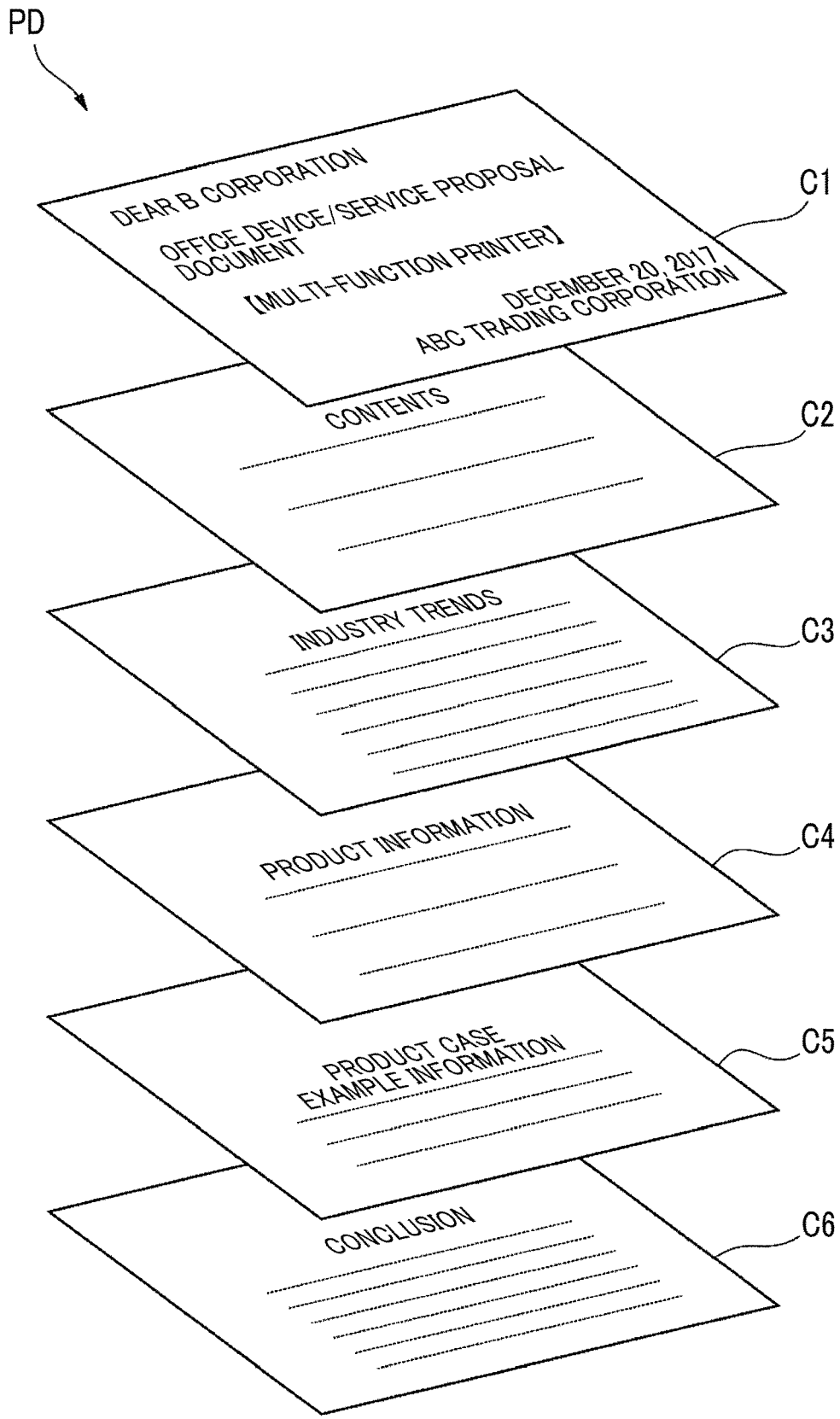
FIG. 2 is a diagram showing an overview of a proposal document according to an exemplary embodiment.

FIG. 2 is a diagram showing an overview of a proposal document PD according to the exemplary embodiment.

As shown in FIG. 2, in the information processing system 1 according to the exemplary embodiment, a proposal document PD formed by plural pieces of content is created. The proposal document PD according to the exemplary embodiment includes, as the plural pieces of content, items of "cover C1" that is a cover, "contents C2" that are contents, "industry trends C3" indicating industry topics such as industry trends, "product information C4" indicating information on products, "product case example information C5" indicating case information relating to usage of products, and "conclusion C6". Here, the content means a group of information capable of forming a headline in the proposal document PD like the respective pieces of information.

Further, the proposal document PD created by the information processing system 1 is used in a case where a user performs an interview or a contract with a customer, for example.

In this exemplary embodiment, the proposal document PD may be created in a form capable of performing display using document creation software or presentation software, for example, or may be created in various file forms such as a portable document format (PDF) form, or an HTML form.

Here, an overview of the information processing system 1 according to the exemplary embodiment will be described.

The server 20 displays plural proposal document creation icons 154i (see FIGS. 8A and 8B to be described later) that respectively receive an instruction of execution of a proposal process relating to a proposal document of products on the screen 10d of the terminal 10 that accesses the server 20.

Further, in a case where an instruction with respect to one proposal document creation icon 154i among the plural proposal document creation icons 154i (which will be described later) is received from a user, the server 20 executes a proposal process in a case where a different proposal document creation icon 154i that has relation to the one proposal document creation icon 154i and is not displayed on the screen 10d on which the one proposal document creation icon 154i is displayed is given an instruction.

In this exemplary embodiment, the "proposal process" includes at least one of plural processes of a "determination process" of determining whether a proposal document relating to a target product is to be created and a "creation process" of creating a proposal document. That is, in the information processing system 1 according to this exemplary embodiment, a case where the proposal process is executed includes a case where only the determination process is executed, a case where only the creation process is executed, and a case where both of the determination process and the creation process are executed.

Hereinafter, the information processing system 1 according to this exemplary embodiment will be described in detail.

Terminal 10

The terminal 10 (that is an example of an image display section) is a device that receives an input of information from a user or displays information on the screen 10d to show the information to the user. The terminal 10 may employ an installation-type installation terminal device such as a desk-top PC, a portable terminal device such as a tablet terminal capable of being carried by a user during walking, or the like.

Further, in this exemplary embodiment, the terminal 10 is capable of communicating with an image forming apparatus that forms (prints) and outputs an image on a recording medium such as a sheet using an image forming material on the basis of print data acquired from the terminal 10.

Server 20

Figure 3:
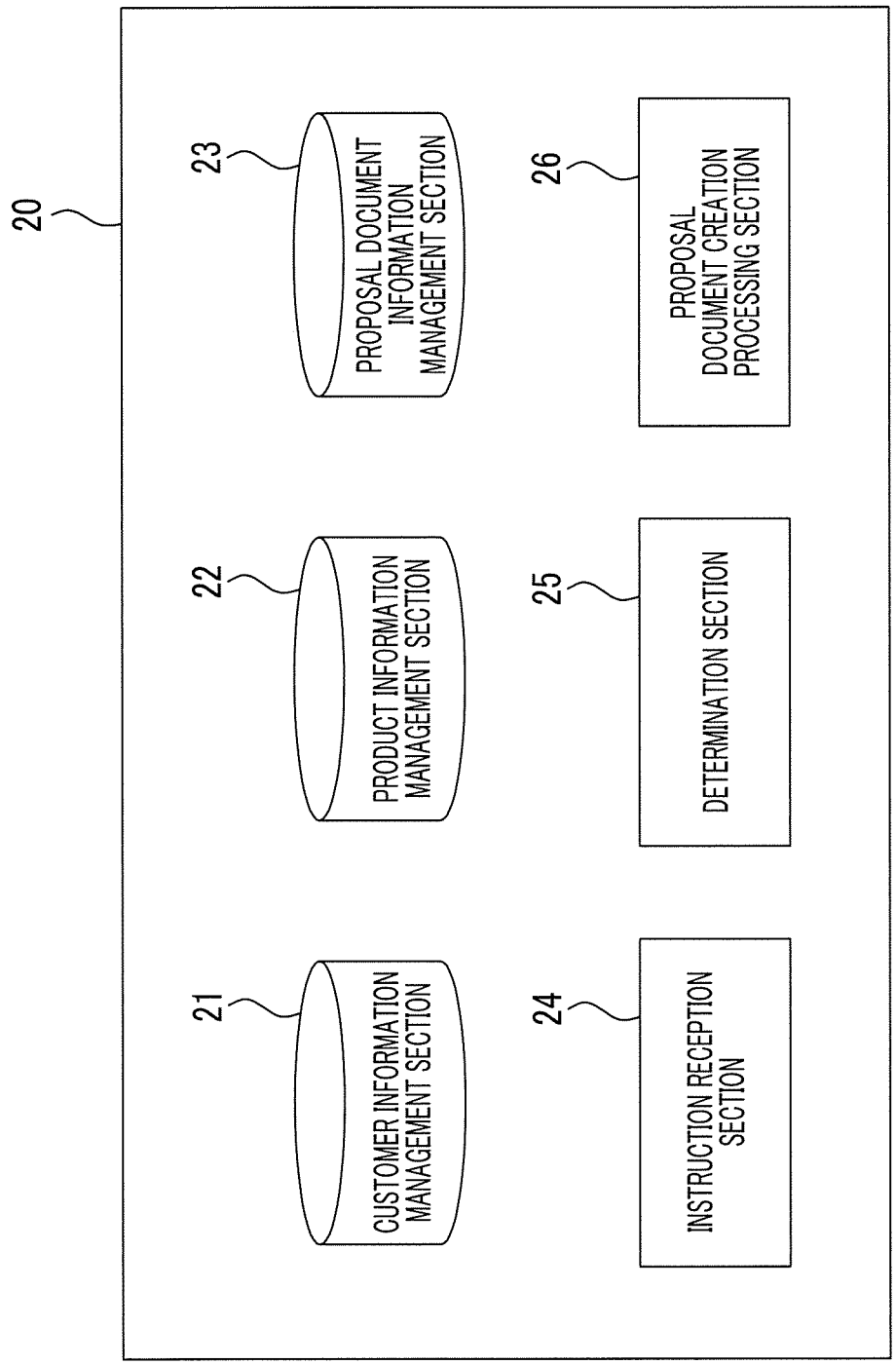
FIG. 3 is a diagram showing a functional configuration of a server according to an exemplary embodiment.

FIG. 3 is a diagram showing a functional configuration of the server 20 according to the exemplary embodiment.

As shown in FIG. 3, the server 20 includes a customer information management section 21 that manages customer information relating to customers, a product information management section 22 that manages information relating to products, and a proposal information management section 23 that manages proposal document information relating to proposal documents. Further, the server 20 includes an instruction reception section 24 (an example of an instruction image display unit, an operation image display unit, and a setting unit) that receives an instruction for execution of a proposal process from a user. In addition, the server 20 includes a determination section 25 (an example of a process execution unit) that performs determination relating to creation of a product proposal document, and a proposal document creation processor 26 (an example of a process execution unit) that creates a proposal document with respect to customers.

Customer Information Management Section 21

The customer information management section 21 performs management of a customer management table 110 that is a list of customer information collected for each customer (see FIG. 4 to be described later). Further, the customer information management section 21 transmits customer information in the customer management table 110 to the instruction reception section 24, the determination section 25, and the proposal document creation processor 26 in accordance with requests.

The customer information management section 21 manages the customer management table 110 by receiving an input of customer information from a user through the terminal 10 or collecting customer information through a network, for example.

FIG. 4 is a diagram showing an example of the customer management table 110 according to this exemplary embodiment.

As shown in FIG. 4, the customer management table 110 includes items of "company name" indicating a name of a customer, "company code" indicating code (sign) information set for each customer, and "business type" for classifying customers in accordance with business types. Further, the customer management table 110 includes items of "contract division name" indicating a name of a division that performs product contracts in customers, "sales representative name" indicating a name of a sales representative who performs sales promotion with respect to a sales company or takes an action after contract or the like, and "sales representative code" indicating code information set for each sales representative. Further, the customer management table 110 includes "contract product ID" indicating ID information for specifying products (hereinafter, contract products) contracted with customers.

In the example shown in FIG. 4, the business type includes retailing, manufacturing, and construction, and may be classified into other businesses such as service, information and communication, finance, or insurance. Further, in this exemplary embodiment, in a case where the type of business does not matter, the business type is set to "common".

The contract product IDs are respectively registered with respect to four products of a multi-function printer (for example, a device in which plural functions among a printing function, a copying function, a scanning function, and a facsimile function are collected), a server, a network device, and a cloud service. In this exemplary embodiment, the contract product IDs are provided in a unit of contract products for each customer. For example, in a case where an "A" corporation makes a contract for plural servers, with respect to the contract product ID, the plural servers of the "A" corporation are handled as one unit.

In the customer management table 110, the contract product ID is expressed as a blank (in the example shown in FIG. 4, displayed as "-") with respect to a product that is not under contract with a customer.

Product Information Management Section 22

Here, in the information processing system 1 according to this exemplary embodiment, general product information that is static product information and product contract information as product information are handled as product information. Further, in the information processing system according to this exemplary embodiment, usage situation information that is dynamic product information is handled as product information. In this exemplary embodiment, customer product information is information specific to a certain customer and a contract product of the customer, and includes the product contract information and the usage situation information.

The product information management section 22 manages the general product information and the product contract information in the product information.

The general product information refers to general information that relates to products handled by a sales company and is not limited to a specific customer. The general product information includes, for example, a manufacturing date or a release date of a product, a pamphlet of the product, features of the product, advantages or disadvantages of the product, a manual of the product, information relating to a previous model of the product, a variety of information relating to a new product, and the like.

Further, the product contract information refers to information relating to a contract for a contract product of each customer. The product contract information includes information on a contract period of a contract product and the number of contract products of each customer, for example.

Proposal Information Management Section 23

FIG. 5 is a diagram showing an example of a proposal information management table 130 according to this exemplary embodiment.

FIG. 6 is a diagram showing an example of a content information management table 230 according to this exemplary embodiment.

Figure 7A:
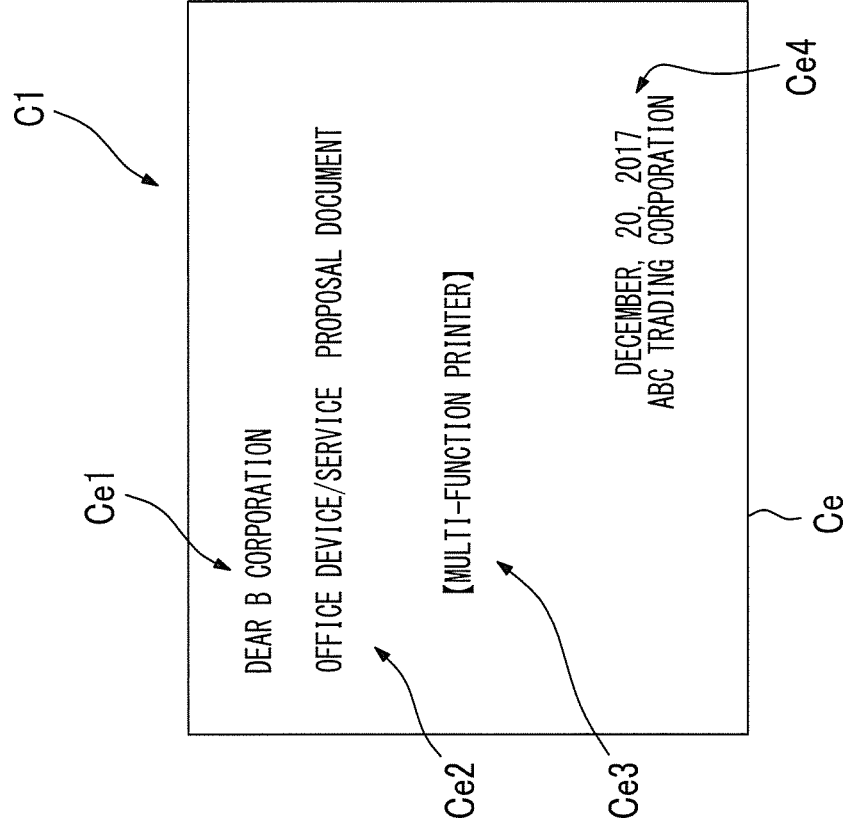
Figure 7B:
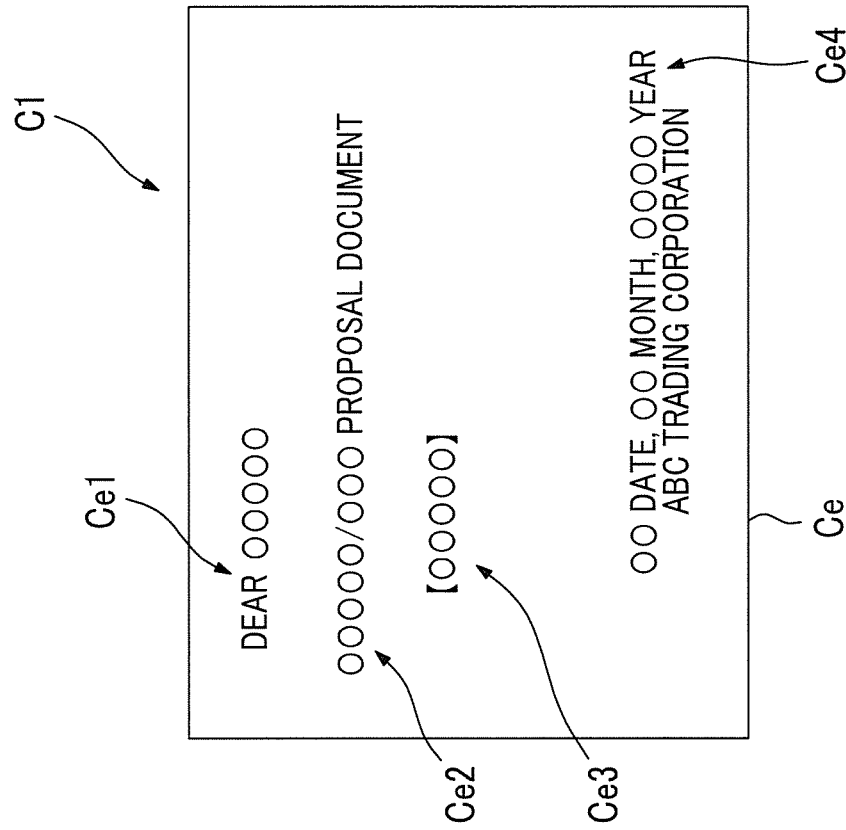

FIGS. 7A and 7B are diagrams showing a creation example of a cover in a proposal document PD.

The proposal information management section 23 manages proposal information for performing a proposal relating to usage of a contract product with respect to a customer. Here, as the proposal information, for example, a proposal relating to cost such as running cost of a contract product, a proposal for enhancing a usage efficiency of a contract product, a proposal relating to improvement of a business efficiency using a contract product, a proposal relating to combination usage of plural products, or the like may be used.

Further, as shown in FIG. 5, the proposal information management section 23 manages the proposal information management table 130. In this exemplary embodiment, the proposal document PD is formed of plural pieces of content (see FIG. 2). Further, the proposal information management table 130 defines a proposal document configuration that is a configuration of content in the proposal document PD.

Here, the proposal document PD according to this exemplary embodiment is designed to be created in accordance with a combination of a product type and a business type. Accordingly, in the proposal information management table 130, for example, proposal document configurations respectively corresponding to a combination in a case where the business type is manufacturing and the product type is a multi-function printer, a combination in a case where the business type of a customer is service and the product type is a network device, and the like are provided.

As shown in FIG. 5, the proposal information management table 130 includes items of "proposal document configuration ID" that is ID information capable of specifying each proposal document configuration and "product type" for classifying products in accordance with types of the products. Further, the proposal information management table 130 includes items of "business type" and "number of configurations of content" indicating the number of configurations of content. In addition, the proposal information management table 130 includes an item of "proposal document configuration information" indicating configuration details of plural pieces of content that form a proposal document.

The product type is information for classifying plural types of products handled by a sales company into predetermined categories (divisions). The product type in this exemplary embodiment has four categories of a multi-function printer, a server, a network device, and a cloud service. For example, the product type of the multi-function printer also includes plural multi-function printers having different model numbers, or the like as a type of the multi-function printer.

As shown in FIG. 5, the proposal document configuration information specifies a combination of plural pieces of content for creating the proposal document PD. In the example shown in FIG. 5, the proposal document configuration information defines a configuration formed by six pieces of content, that is, content 1 corresponding to "cover C1" of the proposal document PD, content 2 corresponding to "contents C2", content corresponding to "industry trends C3", content 4 corresponding to "product information C4", content 5 corresponding to "product case example information C5", and content 6 corresponding to "conclusion C6". Further, the proposal document configuration information specifies each piece of content by a content name indicating a name of the content and a content ID that is ID information for specifying the content.

As shown in FIG. 6, the content information management table 230 includes items of "content ID", "content name", "content classification" indicating content commonality, and "case example type" indicating the type of product case example information. Further, the content information management table 230 includes items of "business type", "embedding information" for specifying information to be embedded in a content material, and "title" indicating information on a title for each piece of content.

The content classification is information for specifying whether details of each piece of content are details limited to only a contract product or details common to other contract products. In the example shown in FIG. 6, content having details common to other contract products is referred to as "common part", and content having details limited to a specific contract product is referred to as "product-specific part".

The case example type is used to specify details of content of product case example information. The case example type is set to "common" with respect to common content regardless of contract products, is set to "product type" with respect to content specific to a specific contract product, and is set to "combination" with respect to content relating to a combination of contract products (which will be described later).

The embedding information specifies individual specific information (specific information) such as a proposal date, a company name, a contract product name of a proposal target, a case to be embedded to a content material prepared as a form.

FIG. 7A shows a content material Ce corresponding to content of the "cover C1", for example. As the content material Ce of the cover, a customer name Ce1, a proposal document title Ce2, a target contract product name Ce3, a date Ce4, and the like are provided as embedding target items.

Further, as shown in FIG. 7B, for example, in a case where a company name is "B corporation", a proposal document relates to "office device/service", a contract product to be proposed is "multi-function printer", and a creation date of the proposal document is Dec. 20, 2017, individual specific information is embedded with respect to each of the customer name Ce1, the proposal document title Ce2, the target contract product name Ce3, and the date Ce4.

Similarly, embedding of specific information with respect to a content material is also performed with respect to different content on the basis of embedding information.

Instruction Reception Section 24

Figure 8A:
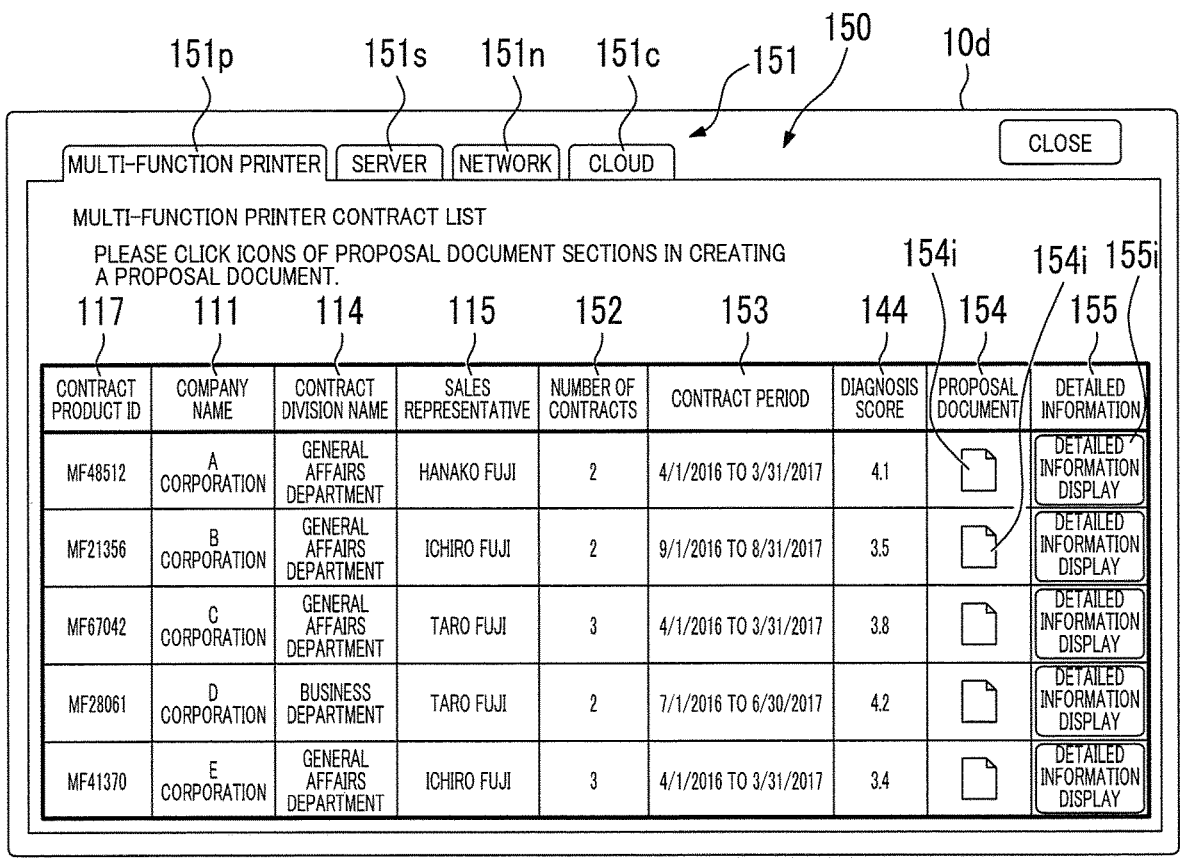
FIGS. 8A and 8B are diagrams showing examples of management images according to an exemplary embodiment.
Figure 8B:
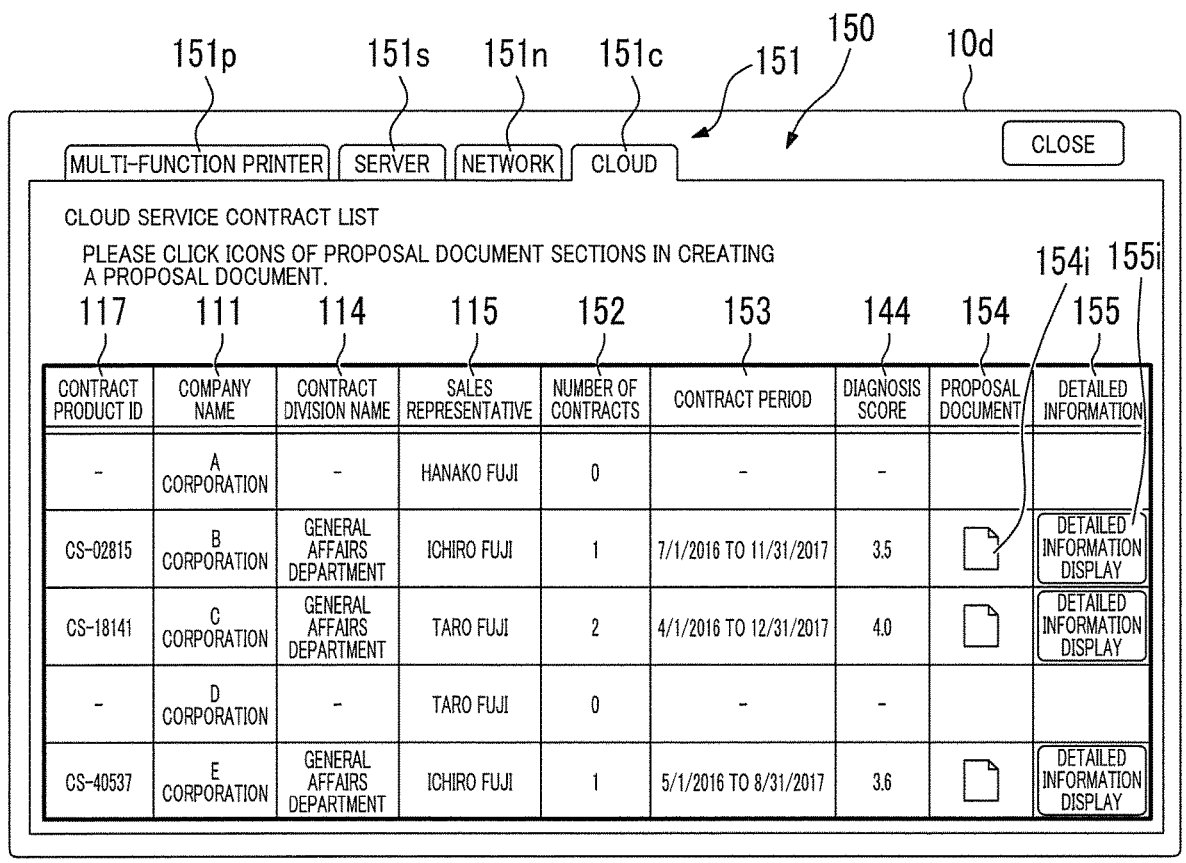

FIGS. 8A and 8B are diagrams showing an example of a management image 150 according to this exemplary embodiment.

The instruction reception section 24 displays the management image 150 including plural proposal document creation icons 154i that receive an instruction for execution of a proposal process from a user on the screen 10d of the terminal 10. Further, the instruction reception section 24 receives an operation with respect to icons (for example, proposal document creation icons 154i) to be displayed on the management image 150. In addition, as an operation with respect to each icon is performed, the instruction reception section 24 executes a process that is set in advance for the icon. In this exemplary embodiment, the operation with respect to the icons is performed by a mouse click operation, a touch-panel tab operation, or the like, for example.

The management image 150 is created on the basis of customer information managed by the customer information management section 21, product information managed by the product information management section 22, and a diagnosis score (which will be described later) specified by the determination section 25.

Further, in the management image 150 according to this exemplary embodiment, items of "contract product ID 117", "company name 111", "contract division name 114", "sales representative name 115", "number of contracts 152" indicating the number of contract products or the number of licenses, and "contract period 153" that is information relating to a contract period of a contract product are displayed on each tab page of each contract product. Further, in the management image 150, items of "diagnosis score 144", "proposal document 154" for creating a proposal document, and "detailed information display 155" for displaying details of a product are displayed.

The proposal document 154 is an item on which the proposal document creation icon 154i for instructing execution of a proposal document creation process is displayed. Plural proposal document creation icons 154i are provided to correspond to the contract product IDs 117. That is, the proposal document creation icon 154i according to this exemplary embodiment is provided for each contract product and for each customer. Further, the proposal document creation icon 154i receives an instruction for execution of the proposal process from a user.

In this exemplary embodiment, an icon image is used as an image for receiving an instruction for execution of a proposal process from a user, but the image is not limited to the icon image. For example, the reception of the instruction for execution of the proposal process from the user may be performed by a text image in which a link is set. In this case, in a case where an operation with respect to one text image in which a link is set is performed, a proposal process in a case where a different text image associated with the one text image is operated may be executed.

The detailed information display 155 is an item on which a detailed information display icon 155$i$ for instructing display of detailed information relating to a contract product. Plural detailed information display icons 155$i$ are provided to correspond to the contract product IDs 117. Further, the detailed information display icon 155$i$ receives an instruction for displaying detailed information relating to a contract product on the screen 10$d$. For example, in a case where the instruction reception section 24 receives an operation of a user with respect to the detailed information display icon 155$i$ is received, the instruction reception section 24 separately displays product information that is not displayed on the management image 150 on the screen 10$d$ using a pop-up display or the like.

Further, in the management image 150 according to this exemplary embodiment, each piece of information associated with the contract product ID 117 is classified for each product type on the basis of a contract product specified by the contract product IDs 117. In this exemplary embodiment, the respective contract product IDs 117 are classified into four product types of a multi-function printer, a server, a network device, and a cloud service. Further, in the management image 150, the plural contract product IDs 117 are classified and displayed on tab pages classified according to product types. Further, in the management image 150, plural tab images 151 (examples of an operation image and a select image) for displaying (opening) respective tab pages are displayed. In the management image 150 according to this exemplary embodiment, as the plural tab images 151, a multi-function printer tab 151$p$, a server tab 151$s$, a network device tab 151$n$, and a cloud service tab 151$c$ are displayed for each product type.

As shown in FIG. 8A, for example, in a case where the multi-function printer tab 151$p$ (tab image 151) is instructed by a user, in the management image 150, a tab page in which the plural contract product IDs 117 with respect to a multi-function printer are collected is displayed as a prior page compared with tab pages of different contract products. In this case, a list of contract product IDs 117 of contract products other than the multi-function printer is hidden under the tab page of the multi-function printer to be in a non-visible state.

Further, as shown in FIG. 8B, in a case where a cloud service tab 151$c$ (tab image 151) is instructed by a user, for example, in the management image 150, a tab page in which plural contract product IDs 117 with respect to the cloud service are collected is displayed as a prior page compared with tab pages of different contract products such as a multi-function printer. In this case, a list of contract product IDs 117 of contract products other than the cloud service is hidden under the tab page of the cloud service to be in a non-visible state.

In the management image 150 formed as described above, as a user performs an operation for selecting a desired tab image 151 so that a user's desired contract product is displayed on the screen 10$d$, a tab page in which the desired contract product is included is selectively displayed on the screen 10$d$.

Here, in this exemplary embodiment, as a classification item for classifying plural contract product IDs 117 (proposal document creation icons 154$i$), a product type (the multi-function printer, the server, the network device, and the cloud service) is used. That is, in the management image 150, the plural contract product IDs 117 (proposal document creation icons 154$i$) are classified into tab pages for respective product types on the basis of the product types.

The classification based on the product types of the contract products has a non-inclusive relationship.

Accordingly, for example, the same contract product ID 117 (proposal document creation icon 154$i$) is not classified into a different tab page in an overlapping manner.

On the other hand, each contract product ID 117 (proposal document creation icon 154$i$) is associated with the company name 111 that is a common item different from a product type of a contract product. The company name 111 that is the common item is an item that is common between different classifications regardless of classifications of contract products.

The common item may be any item that is common between different classifications, regardless of classifications of contract products, such as a business type, a contract division name, a sales representative (sales representative code), the number of contracts, a contract period, or a diagnosis score, instead of the company name 111 (company code).

Figure 9A:
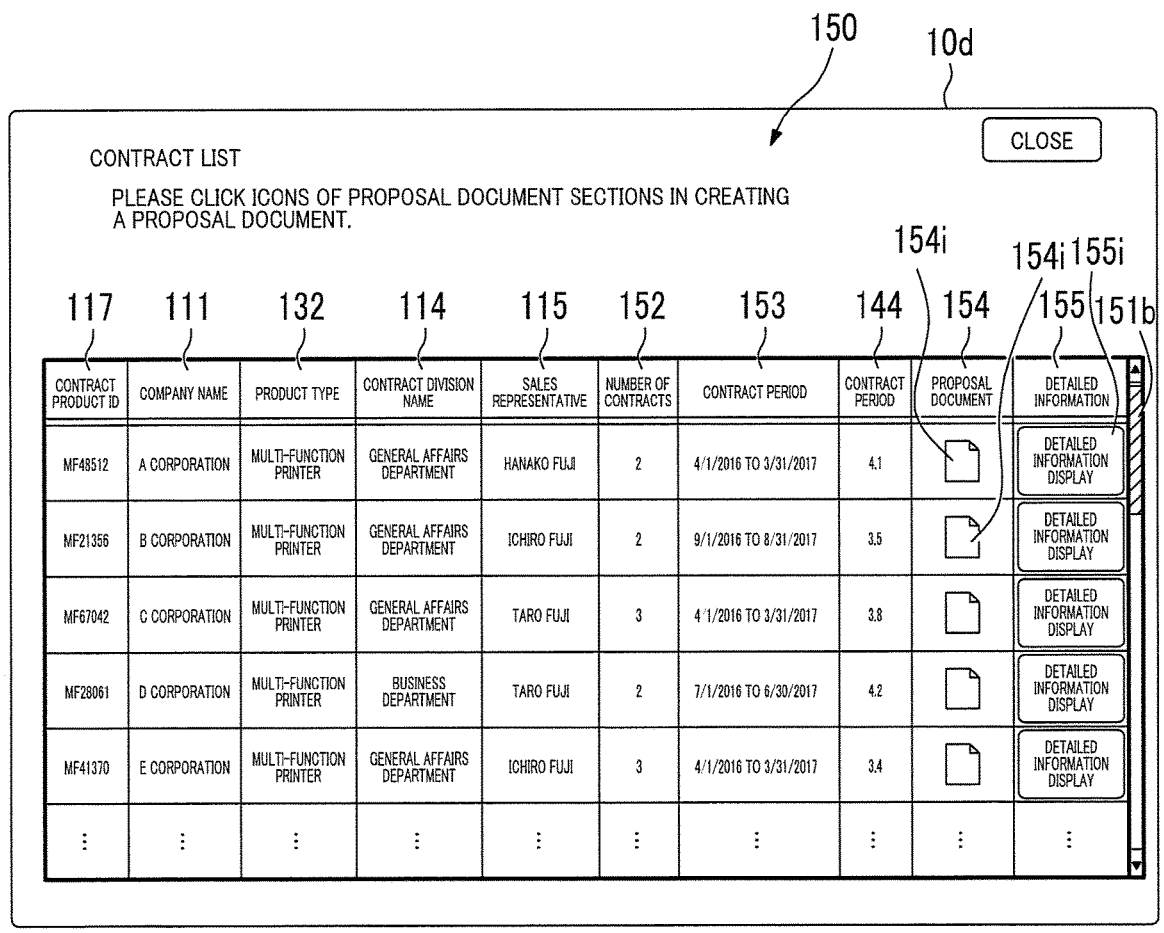
Figure 9B:
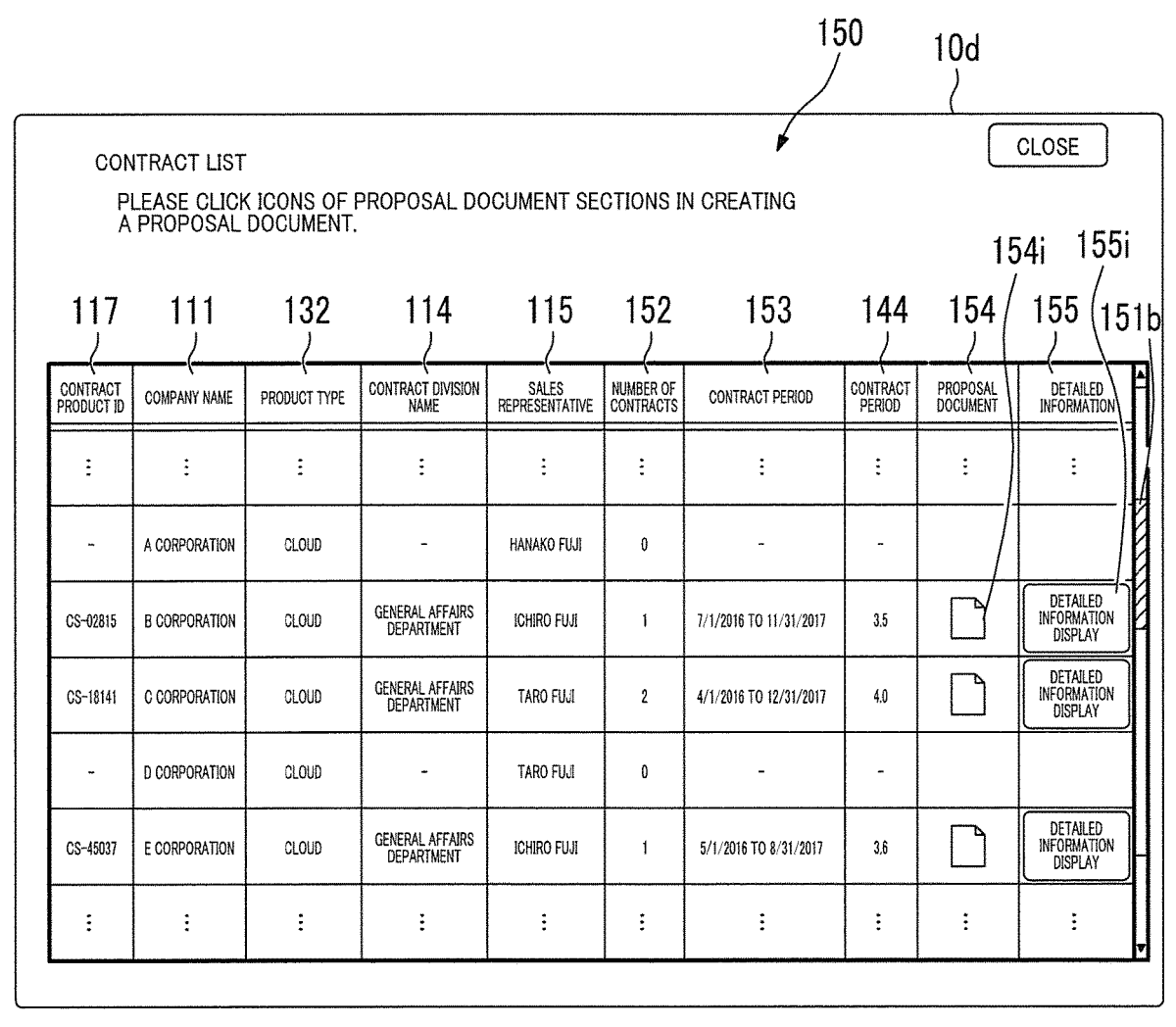

FIGS. 9A and 9B are diagrams showing another example of the management image 150 according to this exemplary embodiment.

As described with reference to FIGS. 8A and 8B, the management image 150 displayed on the screen 10$d$ by the instruction reception section 24 is displayed so that respective tab pages are collected for each contract product, but the exemplary embodiment of the invention is not limited to this example.

As shown in FIG. 9A, the management image 150 may display a list table in which plural contract products are collected. Further, in the management image 150, a scroll bar 151$b$ (an example of an operation image) for receiving an operation for displaying the list table on the screen 10$d$ in a sliding manner is displayed.

For example, in a state shown in FIG. 9A, a prior page of the list table is displayed on the screen 10$d$, and in this state, plural contract product IDs 117 for a multi-function printer are displayed, for example. In this state, for example, different contract product IDs 117 of a cloud service or the like are not displayed on the screen 10$d$.

On the other hand, as the scroll bar 151$b$ is display-operated, as shown in FIG. 9B, a lower page of the list table is displayed on the screen 10$d$, and, plural contract product IDs 117 for the cloud service are displayed, for example. In this state, different contract product IDs 117 of the multi-function printer or the like are not displayed on the screen 10$d$.

Determination Section 25

FIGS. 10A, 10B, and 10C are diagrams showing an example of a diagnosis score table 140 and a condition score table 145 according to this exemplary embodiment.

In a case where an operation with respect to one proposal document creation icon 154$i$ (see FIGS. 8A and 8B) is performed using the management image 150, the determination section 25 performs a proposal document determination process with respect to a contract product of a customer corresponding to the one proposal document creation icon 154$i$ for which the operation is performed. Further, the determination section 25 also performs a proposal document determination process with respect to a contract product corresponding to a different proposal document creation icon 154i associated with the one proposal document creation icon 154i for which the operation is performed by the user.

In this exemplary embodiment, the determination section 25 specifies usage situation information relating to a contract product usage situation of a customer for each contract product of the customer in performing the proposal document determination process. Further, the determination section 25 performs diagnosis relating to contract product usage of the customer on the basis of the usage situation information.

The determination section 25 performs a determination process of whether to create a proposal document PD for a target contract product on the basis of a diagnosis score of the target contract product and a reference request score. In this exemplary embodiment, the determination section 25 sets the diagnosis score to become higher in a case where a diagnosis result is desirable, and sets the diagnosis score to become lower in a case where the diagnosis result is not desirable. Further, in a case where the diagnosis score is lower than a score that is set in advance as the reference request score (in a case where the request is not satisfied), the determination section 25 determines that the proposal document is to be created with respect to the target contract product. The determination section 25 displays a determination result having content indicating that the proposal document is to be created on the screen 10d, to thereby report its message to a user.

Further, as shown in FIGS. 10A and 10B, the determination section 25 retains a diagnosis result for each contract product of each customer as the diagnosis score table 140.

As shown in FIG. 10A, the diagnosis score table 140 of the multi-function printer includes items of "contract product ID", "product type", "number of contracts", and "diagnosis score" indicating a numerical value of a diagnosis score. Further, in the example shown in FIG. 10A, for each of plural contract product IDs of the multi-function printer, a score (numerical value) is registered as a result of a diagnosis score. Similarly, in the example of FIG. 10B, for each of plural contract product IDs of the cloud service, a score is registered as a result of a diagnosis score.

Although not shown, the determination section 25 similarly manages the diagnosis score table 140 with respect to the server and the network device. That is, for each contract product ID with respect to the server or the network device, a score is registered as a result of a diagnosis score.

Further, as shown in FIG. 10C, the condition score table 145 includes items of "condition ID" for specifying each condition score, "target item" indicating the type of a diagnosis score that is a comparison target of the condition score, and "request score" indicating a numerical value of a request score. In this way, in this exemplary embodiment, for each product type (the multi-function printer, the server, the network device, and the cloud service), a request score is registered.

Subsequently, specification of a diagnosis score according to this exemplary embodiment will be described in detail.

The determination section 25 acquires usage situation information relating to a contract product usage situation of a customer. The acquisition of the usage situation information in the determination section 25 is performed by directly collecting an operation of a contract product through a network of the information processing system 1, or is performed by receiving an input of information relating to the operation of the contract product collected by a different server, for example. Further, the determination section 25 performs digitization on the basis of the acquired usage situation information, and specifies a diagnosis score in the unit of a contract product for each customer.

In this exemplary embodiment, the contract product usage situation is specified in plural viewpoints. Further, in this exemplary embodiment, the determination section 25 performs digitization on the basis of a predetermined condition in each of the plural viewpoints. In addition, the determination section 25 sets an average of digitized scores in each of the plural viewpoints as a diagnosis score of each contract product, for example.

As the contract product usage situation, a viewpoint relating to cost of a contract product, a viewpoint relating to business efficiency to which the contract product contributes, a viewpoint relating to information security of the contract product, and a viewpoint relating to ecology of the contract product are provided.

For example, in a case where a contract product is a multi-function printer, as a viewpoint relating to cost of the contract product, an execution ratio of duplex printing, an execution ratio of so-called n-up printing for collecting and printing plural logic pages on one physical page, or the like may be used. Further, for example, in a case where the execution ratio of the duplex printing is relatively high, since the number of sheets to be consumed is reduced, a diagnosis score in the cost viewpoint becomes high, and in a case where the execution ratio of the duplex printing is low, since the number of sheets to be consumed increases, the diagnosis score becomes low.

Further, in a case where the contract product is the multi-function printer, as a viewpoint relating to ecology of the contract product, a utilization factor of a power saving mode provided in a product, a reduction rate of carbon dioxide discharged in accordance with use of the product, or the like may be used.

In addition, in a case where the contract product is the multi-function printer, as a viewpoint relating to business efficiency to which the contract product contributes, the number of times of transmission of facsimile accompanied by scanning of a paper document, a scan rate of the paper document, a ratio of electronic data in original information in print output, years of usage of the contract product, a contract product operating ratio, an environment where the multi-function printer is disposed such as arrangement of the multi-function printer in an office or the like, or the like may be used.

Further, in a case where the contract product is the multi-function printer, as a viewpoint relating to information security of the contract product, the number of print-outs of a reception facsimile relating to a leaving risk of a received document, the number of data acquisitions from a carried auxiliary storage unit relating to a taking-out risk of confidential information, a state of security software in a network environment in a customer company where the product is disposed, for example, or the like may be used.

In this exemplary embodiment, similarly, diagnosis scores are also respectively specified with respect to the server, the network device, and the cloud service on the basis of usage situation information specified in the plural viewpoints.

Proposal Document Creation Processor 26

The proposal document creation processor 26 executes a creation process of a proposal document PD on the basis of an execution instruction from a user. In this exemplary embodiment, in a case where an operation with respect to one proposal document creation icon 154i is performed by the management image 150, the proposal document creation processor 26 creates a proposal document PD with respect to a product of a customer corresponding to the one proposal document creation icon 154*i*. Further, in a case where an operation with respect to a proposal document creation icon 154*i* displayed on a notification image 160 (which will be described later) is performed, the proposal document creation processor 26 creates a proposal document PD with respect to a product of a customer corresponding to this proposal document creation icon 154*i*.

Next, a creation process of a proposal document in the information processing system 1 according to this exemplary embodiment will be described.

FIG. 11 is a flowchart showing a processing flow of a proposal document creation process in the information processing system 1.

FIG. 12 is a diagram showing an example of the notification image 160 according to this exemplary embodiment.

As shown in FIG. 11, first, an operation with respect to a proposal document creation icon 154*i* corresponding one contract product ID is received from a user through the management image 150 (step S101). Here, for example, it is assumed that a proposal document creation icon 154*i* for a company name "B corporation" and a contract product ID "MF21356" is operated by the management image 150 that displays a tab page of a multi-function printer (see FIG. 8A).

Then, it is determined whether a diagnosis score of a contract production (contract product ID 117) corresponding to the proposal document creation icon 154*i* operated by the user is lower than a request score (step S102). In this example, the determination is performed on the basis of the diagnosis score of the contract product ID "MF21356" of the "multi-function printer" of the "B corporation" and the request score (see FIGS. 10A and 10C).

Further, as a determination result, in a case where the diagnosis score is equal to or greater than the request score (NO in step S102), a message indicating that it is not necessary to create a proposal document with respect to the contract product ID 117 corresponding to the proposal document creation icon 154*i* operated by the user is notified with respect to the user (step S103).

On the other hand, as a determination result, in a case where the diagnosis score is lower than the request score (YES in step S102), a proposal document configuration with respect to the contract product corresponding to the proposal document creation icon 154*i* operated by the user is specified (step S104).

Further, a determination process for determining whether the diagnosis score is lower than a request score is performed with respect to a different contract product of the customer of the contract product ID 117 corresponding to the proposal document creation icon 154*i* operated by the user (step S105). In this example, the different contract product (for example, "CS-02815" of "cloud service") is specified from the contract product ID of the "B corporation" with reference to the customer management table 110 (see FIG. 4). Further, similarly to the multi-function printer, the determination is performed on the basis of the diagnosis score and the request score (see FIGS. 10B and 10C).

In a case where there is a contract product (for example "cloud service") of which the diagnosis score is lower than the request score with respect to the different contract product of the customer (YES in step S105), a message indicating that there is the different contract product (for example, "cloud service") of which the diagnosis score is lower than the request score is notified with respect to the user (step S106).

In this exemplary embodiment, as shown in FIG. 12, the notification image 160 is displayed on the screen 10*d* of the terminal 10. On the notification image 160, a "warning display 161" for urging confirmation of notification details and a "notification message 162" indicating that there is a contract product capable of being proposed with respect to a different contract product are displayed. Further, on the notification image 160, an "operation message 163" for urging creation of a proposal document with respect to a different contract product (for example, "cloud service") to a user, and an "extract screen 164" that shows extraction of information relating to the different contract product from the management image 150 are displayed.

More specifically, as shown in FIG. 12, on the notification image 160, the proposal document creation icon 154*i* for receiving an instruction for execution of a proposal document creation process with respect to the "cloud service" of the "B corporation" is displayed. The notification image 160 is displayed on the management image 150 on which the multi-function printer tab 151*p* including display of the proposal document creation icon 154*i* of the "multi-function printer" of the "B corporation" is selectively operated, on the screen 10*d*.

Then, it is determined whether the proposal document creation instruction is received from the user with respect to the different contract product of which the diagnosis score is lower than the request score (step S107). In this example, in a case where the proposal document creation icon 154*i* on the notification image 160 shown in FIG. 12 is operated, it is determined that the proposal document creation instruction is received. On the other hand, in a case where a "close button 165" of the notification image 160 is operated, or in a case where the proposal document creation icon 154*i* is not operated until a predetermined time elapses, it is determined that the proposal document creation instruction is not present.

Further, in a case where the proposal document creation instruction is present (YES in step S107), a proposal document configuration with respect to the different contract product is specified (step S108).

On the other hand, in a case where the proposal document creation instruction is not present (NO in step S107), the procedure returns to step S105 again, and then, a determination process for determining whether a diagnosis score is lower than a request score with respect to a further different contract product (for example, "server") of the customer is performed.

Further, in this example, in a case where the determination process with respect to the server is performed, the determination process with respect to all contract products of the "B corporation" is finally performed, and thus, a target contract product for which the determination process is to be performed is not present (NO in step S105), the procedure proceeds to step S109.

In step S109, electronic data of the proposal document PD is created on the basis of the proposal document configuration of the created proposal document PD. Further, by displaying the created proposal document PD on the screen 10*d* to be presented to the user, the series of proposal document creation processes are terminated.

As described above, in the information processing system 1 according to this exemplary embodiment, for example, in a case where a user performs an operation with respect to one proposal document creation icon 154*i* to perform a proposal for one contract product with respect to a certain customer, for example, a proposal with respect to a different contract product of the same customer is notified. That is, a proposal process in a case where a different proposal document creation icon 154*i* associated with the one proposal document creation icon 154*i* is operated is performed. In this way, in the information processing system 1 according to this exemplary embodiment, a proposal with respect to a contract product that is not under consciousness of a user or is not noticed by the user is notified with respect to the user.

In this exemplary embodiment, "company name" of one proposal document creation icon 154i is used in specifying a different proposal document creation icon 154i associated with one proposal document creation icon 154i, but the invention is not limited thereto. As the relation, for example, matters that match each other between one proposal document creation icon 154i and a different proposal document creation icon 154i, such as a common item, may be used.

Further, as the relation, a case where a connection is present between a certain matter and a different matter even in a case where the matters do not completely match each other may be used. For example, as an example of a related company, with respect to a certain company, a different company having a group relationship with the certain company may be used. Further, as an example of the related company, with respect to a certain company, a different company that is located at the same district where the certain company is located may be used.

Further, in the information processing system 1 according to this exemplary embodiment, a proposal document PD is created on the basis of an instruction from a user. Particularly, as described above, as a result of a determination process, in a case where there is an instruction for performing proposals with respect to plural contract products from a user, creation of a proposal document in which the proposals with respect to the plural contract products are integrated (hereinafter, referred to as creation of an integrated proposal document) is performed. Further, in this exemplary embodiment, in creating the integrated proposal document, a case in which a problem cannot be settled only by a single product and may be settled by a combination of plural products according to combinations of products in the integrated proposal document is proposed (hereinafter, referred to as a combination proposal).

In the above-described example, the notification image 160 including the proposal document creation icon 154i of the "cloud service" of the "B corporation" is displayed on the screen 10d in accordance with an operation with respect to the proposal document creation icon 154i of the "multi-function printer" of the "B corporation", but in a case where there are plural products capable of being proposed other than a contract product that is first selected by a user, the notification image 160 including the proposal document creation icons 154i of the plural contract products of the "B corporation" may be displayed on the screen 10d in accordance with the operation with respect to the proposal document creation icon 154i of the "multi-function printer" of the "B corporation". Further, in a case where an operation with respect to the proposal document creation icon 154i included in the notification image 160 is performed, a proposal document creation icon 154i of a different contract product capable of being further proposed may be displayed.

Creation of Integrated Proposal Document

Subsequently, creation of a proposal document PD based on a proposal document configuration will be described in detail. Hereinafter, description will be made with respect to an example in which an integrated proposal document in which proposals of plural contract products are integrated is created.

Figure 13:
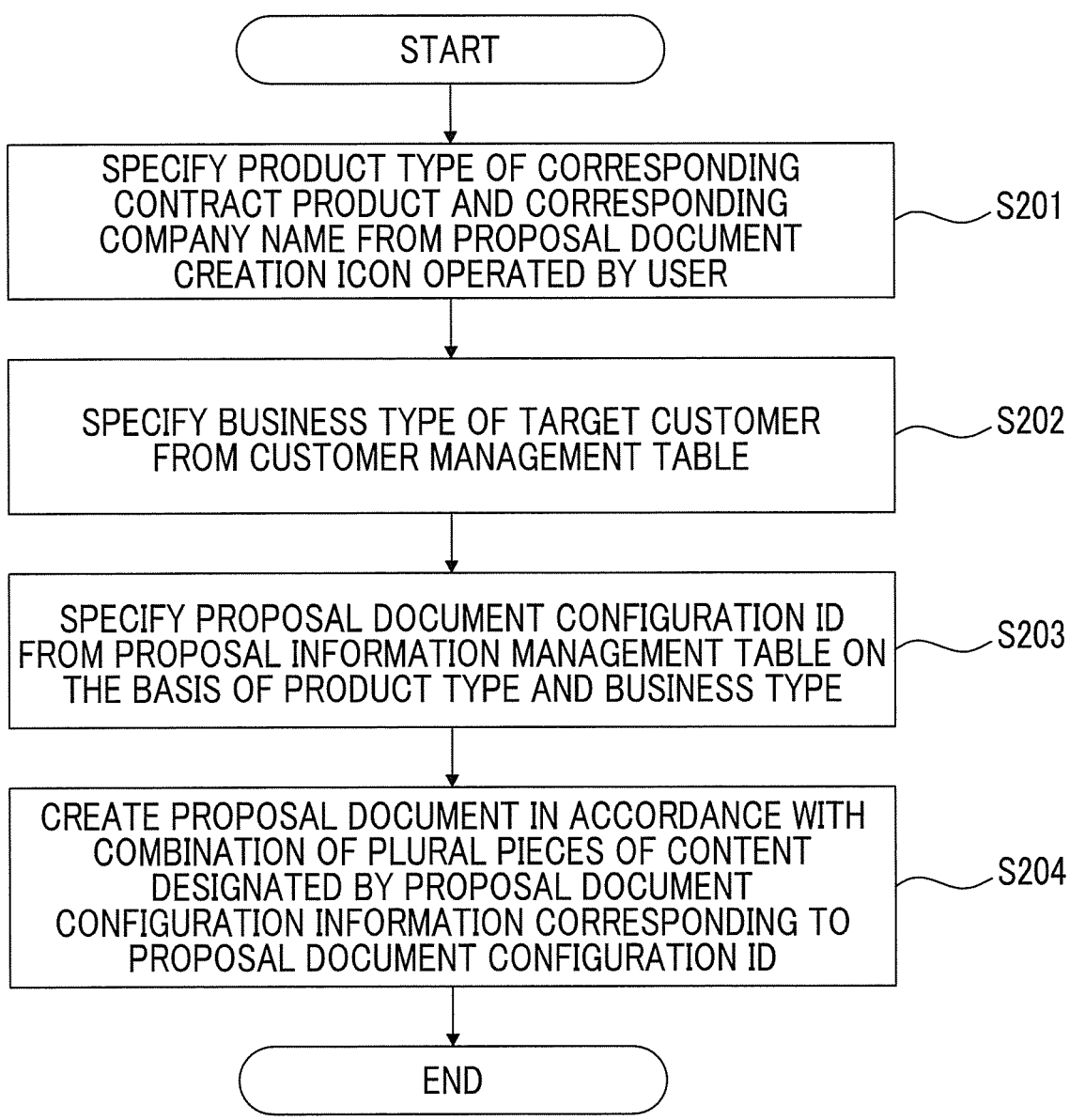
FIG. 13 is a flowchart showing a processing flow of creation of a proposal document based on a proposal document configuration.

FIG. 13 is a flowchart showing a processing flow of creation of a proposal document PD based on a proposal document configuration.

As shown in FIG. 13, first, a product type of corresponding contract product and a corresponding company name are specified from a proposal document creation icon 154i operated by a user (step S201). Here, for example, it is assumed that the proposal document creation icon 154i corresponding to a contract product ID "MF21356" is operated by the user, the company name is specified as "B corporation", and the product type is specified as "multi-function printer" (see FIG. 8A).

Then, a business type of a target customer is specified from the customer management table 110 (see FIG. 4) (step S202). In this example, since the company name is "B corporation", the business type is specified as "manufacturing".

Further, a proposal document configuration ID is specified from the proposal information management table 130 (see FIG. 5) on the basis of the product type and the business type (step S203). In this example, on the basis of the product type "multi-function printer" and the specified business type "manufacturing", the proposal document configuration ID is specified as "ST-10011".

Further, the proposal document PD is created in accordance with a combination of plural pieces of content designated by proposal document configuration information corresponding to the proposal document configuration ID (step S204). In this example, as shown in FIG. 5, the proposal document PD is created in the order of "cover" of a content ID "FC-002", "contents" of a content ID "TC-001", "industry trends" of a content ID "TR-001", "product information" of a content ID "PR-101", "product case example information" of a content ID "EX-101", and "conclusion" of a content ID "SU-002", as a combination of pieces of content designated by the proposal document configuration ID "ST-10011".

In the above-described example, a proposal document configuration of a proposal document PD to be created is based on a single contract product. On the other hand, there is a case where a proposal document PD is created on the basis of plural contract products.

Hereinafter, a case where a proposal document PD is created on the basis of plural contract products will be described in detail.

Figure 14:
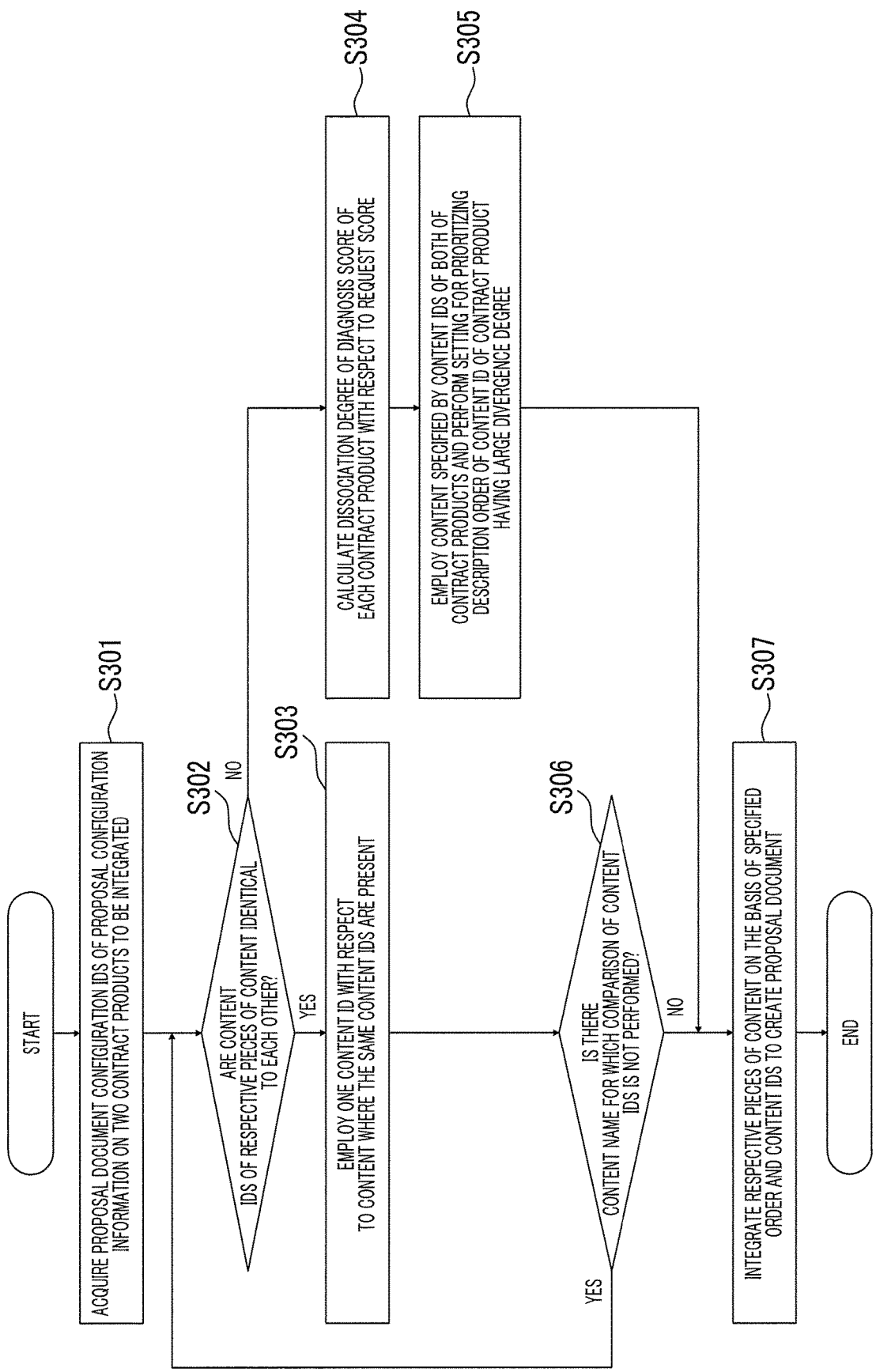
FIG. 14 is a flowchart showing a flow of creation of a proposal document based on plural contract products.

FIG. 14 is a flowchart showing a flow of creation of a proposal document based on plural contract products.

Figure 15B:
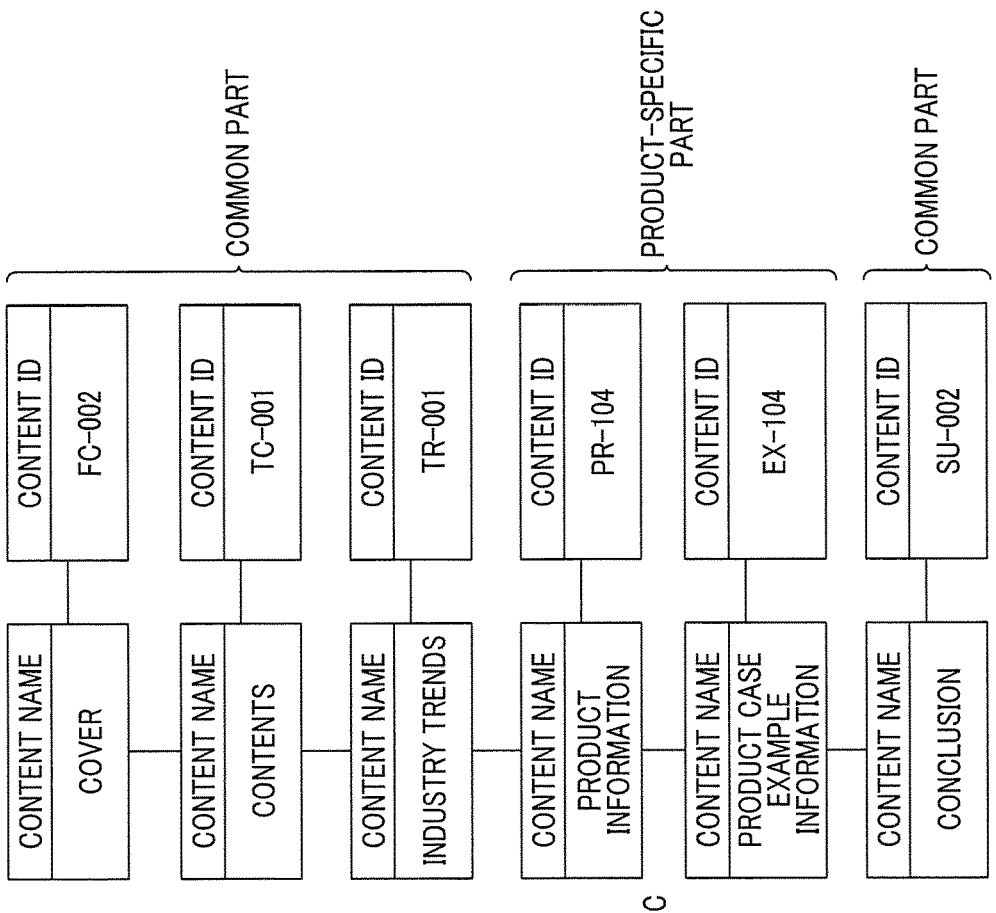
FIGS. 15A and 15B are diagrams showing configuration examples of a proposal document before proposal information is integrated.
Figure 15A:
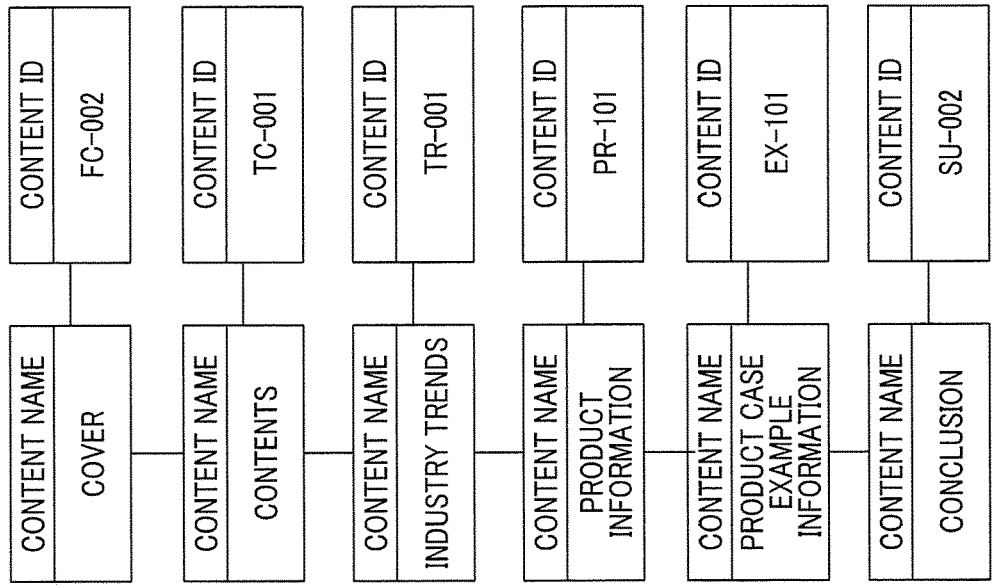

FIGS. 15A and 15B are diagrams showing configuration examples of a proposal document before proposal information is integrated.

FIG. 16 is a diagram showing a configuration example of a proposal document in a case where proposal information on plural contract products are integrated.

In the following description, a case where a company name is "B corporation" and product types of contract products are "multi-function printer" and "cloud service" will be described.

As shown in FIG. 14, first, proposal document configuration IDs of proposal configuration information on two contract products to be integrated are respectively acquired (step S301). Specifically, as shown in FIG. 15A, a proposal document configuration ID "ST-10011" of the multi-function printer is specified, and as shown in FIG. 15B, a proposal document configuration ID "ST-10411" of the cloud service is specified.

In this case, as shown in FIGS. 15A and 15B, in comparing a proposal document configuration of the multi-function printer a proposal document configuration of the cloud service, content IDs of "cover", "contents", "industry trends", and "conclusion" are common. On the other hand, content IDs of "product information" and "product case example information" are respectively different from each other.

Further, with respect to two pieces of proposal document configuration information, it is determined whether or not content IDs of each piece of content are identical to each other (step S302). That is, content IDs are compared with each other for each content name. Further, in two pieces of proposal document configuration information, in a case where the same content IDs are present (YES in step S302), one content ID is employed with respect to the content (content name) (step S303).

On the other hand, in two pieces of proposal document configuration information, in a case where content IDs are different from each other with respect to the same content name (NO in step S302), a divergence degree of a diagnosis score of each contract product with respect to a request score is calculated (step S304). Here, the divergence degree refers to a difference between the request score and the diagnosis score, in which as the difference becomes larger, the divergence degree becomes larger, and the difference is smaller, the divergence degree becomes smaller.

Further, in a case where the content IDs are different from each other with respect to the same content name, content specified by content IDs of both contract products is employed. Here, a description order in the proposal document PD is set so that content having a relatively large divergence degree is given a priority and comes on a front page and content having a relatively small divergence degree comes on a rear page (step S305). In this example, it is determined that the cloud service has a large divergence degree.

In the proposal document PD, giving a priority to certain content means that the certain content is handled prior to different content. Accordingly, in a case where content to be prioritized is written on the same page as different content in the proposal document PD, it is desirable that the content to be prioritized is written earlier than the different content on the same page. Further, giving a priority to certain content is not limited to the order. For example, a configuration in which content to be prioritized is given a priority of expression, such as highlighting the content to be prioritized compared with different content, may be used.

Then, in a case where it is determined whether there is a content name for which comparison of content IDs is not performed (step S306). In a case where there is a content name for which the comparison is not performed (YES in step S306), the procedure returns to step S302.

On the other hand, in a case where there is no content name for which the comparison is not performed (NO in step S306), the respective pieces of content is integrated on the basis of an order of content IDs designated by proposal document configuration IDs and the order of content specified in step S305, to create the proposal document PD (step S307).

As shown in FIG. 16, the content (content ID "FC-002") of "cover", the content (content ID "TC-001") of "contents", and the content (content ID "TR-001") of "industry trends" sequentially become a common part between the multi-function printer and the cloud service to form one piece of content. Further, with respect to the content of "product information", the cloud service (content ID "PR-104") having a first priority and the multi-function printer (content ID "PR-101") having a later priority on the basis of the divergence degree are sequentially disposed to form a product-specific part. Similarly, with respect to the content of "product case example information", the cloud service (content ID "EX-104") having a first priority and the multi-function printer (content ID "EX-101") having a later priority on the basis of the divergence degree are sequentially disposed to form a product-specific part. Further, finally, the content (content ID "SU-002") of "conclusion" forms one piece of content as a common part between the multi-function printer and the cloud service.

In the above-described example, in specifying a priority in an order of plural products in a proposal document PD, a divergence degree based on usage situation information among customer product information is used, but the invention is not limited thereto. For example, a priority in an order of plural products in a proposal document PD may be specified on the basis of product contract information such as contract periods of plural contract products.

Combination Proposal Information

Next, in a case where plural contract products are integrated, an example in which combination information relating to product usage in a case where plural contract products are combined is created will be described.

FIG. 17 is a flowchart showing a flow of creation of combination proposal information on plural products according to this exemplary embodiment.

FIG. 18 is a diagram showing combination reference information on plural contract products.

Figure 19:
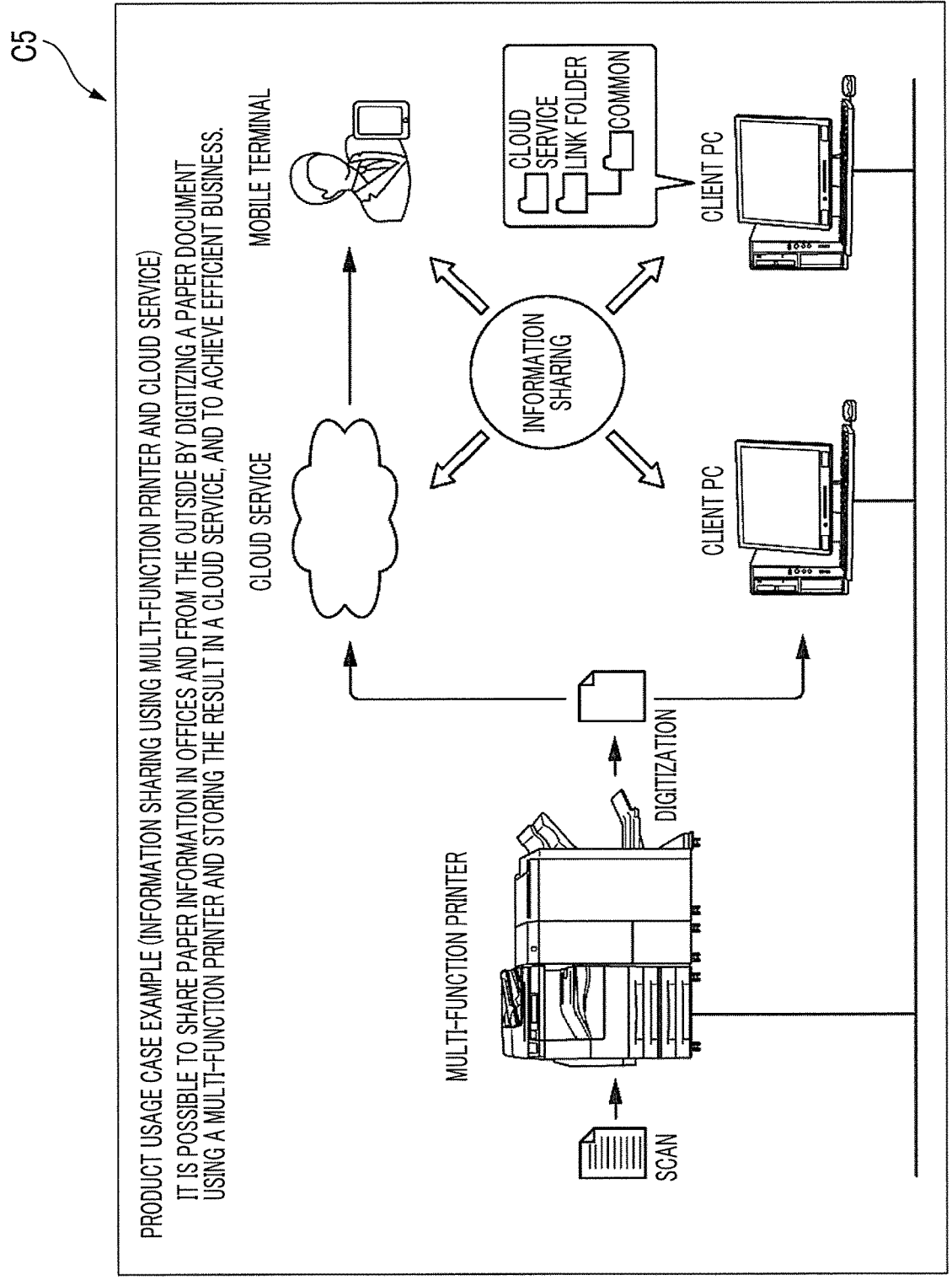
FIG. 19 is a diagram showing a specific example of content of product case example information.

FIG. 19 is a diagram showing a specific example of content of product case example information.

Figure 20:
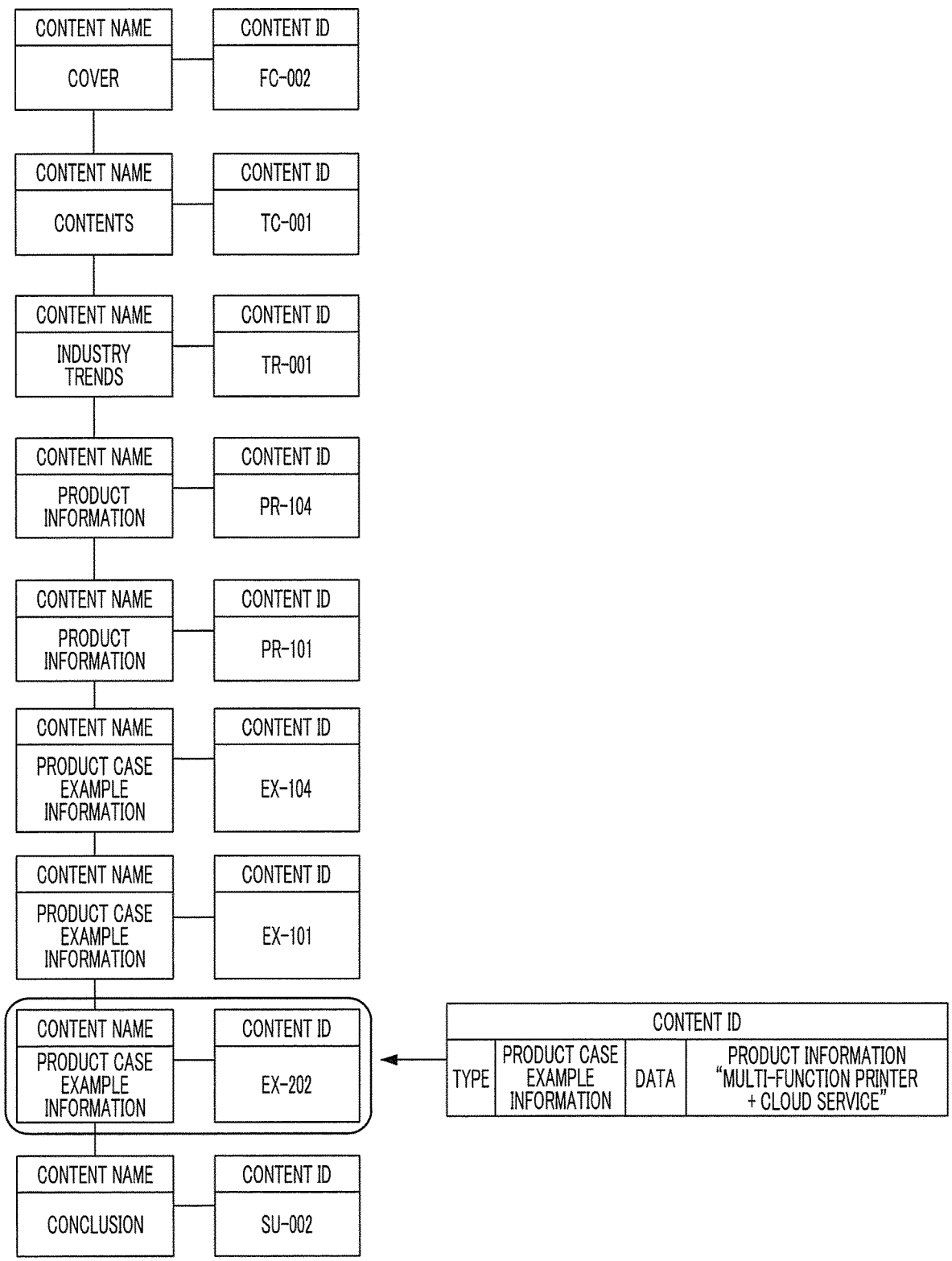
FIG. 20 is a configuration example of a proposal document in a case where combination case information is additionally included.

FIG. 20 is a configuration example of a proposal document PD in a case where combination case information is additionally included.

As shown in FIG. 17, information on plural contract products included in an integrated proposal document is acquired (step S401). That is, information on plural contract products for which it is determined that a proposal document is to be created on the basis of a diagnosis score is acquired.

Further, on the basis of the acquired plural contract products it is confirmed whether or not product case example information indicating a combination of plural contract products is present (step S402). In this exemplary embodiment, the confirmation of whether or not the product case example information indicating the combination of the plural contract products is present is performed on the basis of combination reference information 400.

For example, in a case where contract products in an integrated proposal document are "multi-function printer" and "cloud service", a content name "EX-202" is specified with reference to FIG. 18.

In FIG. 18, an example in which all combination cases of plural contract products shown in this exemplary embodiment are prepared is shown.

Further, as shown in FIG. 19, as an example of content of the product case example information C5, a product utilization case in a case where the multi-function printer and the cloud service are combined is shown. Here, a case in which business efficiency is achieved by a combination of the multi-function printer and the cloud service is shown.

In this example, it is determined that there is a combination case (YES in step S402), and content of product case example information indicating a combination of products is added to details of a proposal document in which proposal information on plural contract products are integrated (step S403).

In this example, as shown in FIG. 20, in the proposal document PD, after the content of "product case example information" of each contract product that is a combination target and before the content of "conclusion", the content (content ID "EX-202") of "product case example information" relating to plural product combinations is added.

In this example, in a case where it is determined that there is no combination case (NO in step S402), a proposal document PD in which proposal information on plural contract products is integrated is created, without addition of product case example information indicating a combination of contract products.

Further, in this example, an example of combination proposal information based on a combination of two products is shown, but the invention is not limited thereto. For example, in a case where proposals of three or more products are included in creation of an integrated proposal document, combination proposal information with respect to a case where three or more products are combined may be included in the proposal document PD.

As described above, in the information processing system 1 according to this exemplary embodiment, when a user wants to create a proposal document PD with respect to a customer using a system, in a case where a different contract product other than a contract product of which the user is conscious may be proposed, as information relating to the contract product that is not displayed on the screen 10d (management image 150), the information is notified from the system (see FIG. 12). Further, in the information processing system 1, the user may easily recognize that there is a product that may be proposed to the customer with respect to the different contract product. Thus, in the information processing system 1 according to this exemplary embodiment, it is possible for the user to create in parallel a proposal of a different contract product other than a contract product for which current proposal information is to be created, without performing a display operation for display from the user such as display switching or retrieval of an image on the screen 10d. Thus, it is possible to efficiently and completely a proposal document PD with respect to a customer.

Further, in the information processing system 1 according to this exemplary embodiment, by creating a proposal document PD including a proposal in which plural contract products are combined, it is possible to perform a proposal capable of providing more reliability to a customer.

In the information processing system 1 according to this exemplary embodiment, in a case where an instruction for execution of a proposal process, for example, with respect to a proposal document creation icon 154i is received from a user, a proposal process with respect to a different proposal document creation icon 154i specified on the basis of usage situation information that is an example of customer product information is performed, but the invention is not limited thereto.

For example, in the information processing system 1 according to this exemplary embodiment, in a case where an instruction for execution of a proposal process with respect to a proposal document creation icon 154i is received from a user, a proposal process with respect to a different proposal document creation icon 154i specified on the basis of customer product information may be executed.

In this case, information on a contract period of a contract product may be used as the customer product information, for example. The information on the contract period is acquired from the product information management section 22.

With respect to a product having a short period up to an expiration date of a contract period, it is highly necessary to perform a proposal relating to a product with respect to a customer. Thus, in a case where an instruction for a certain proposal document creation icon 154i is present, a creation process with respect to a proposal document creation icon 154i of a product that is associated with a product corresponding to the certain proposal document creation icon 154i and is close to an expiration date of a contract period is performed.

For example, in a case where there is an instruction for a proposal document creation icon 154i with respect to a multi-function printer of a customer A, a creation process of a proposal document is performed with respect to a different customer B, with respect to a product having a short period up to an expiration date of a contract period as the multi-function printer X is performed.

Subsequently, hardware configurations of the terminal 10 and the server 20 according to this exemplary embodiment will be described.

The terminal 10 and the server 20 according to this exemplary embodiment include a central processing unit (CPU) that is a calculation unit, a memory that is a main storage unit, a magnetic disk drive (hard disk drive: HDD), a network interface, and a display mechanism including a display, a sound mechanism, an input device such as a keyboard or a mouse, and the like, respectively.

Further, the magnetic disk drive stores an OS program and an application program. Further, as the programs are read into the memory and are executed by the CPU, functions of respective functional sections in each of the terminal 10 and the server 20 according to this exemplary embodiment are realized.

Further, a program for causing the terminal 10 and the server 20 to realize a series of operations in the information processing system 1 according to this exemplary embodiment may be provided through a communication section, for example, or may be provided in a state of being stored in a variety of recording mediums.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
an image display section that includes a screen on which an image is displayed;
a central processing unit that is able to display a plurality of reception images for respectively receiving an instruction for execution of a predetermined process on the screen; and
the central processing unit that executes, in a case where an operation with respect to a first reception image among the plurality of reception images is received from a user, the process with respect to a second reception image that is associated with the first reception image among the plurality of reception images and is not displayed on the screen on which the first reception image is displayed,
wherein the central processing unit that respectively sets classification items for classifying the plurality of reception images and a common item that is common between different classifications, with respect to the plurality of reception images, wherein the central processing unit displays the first reception image on the screen in accordance with classification displays based on the classification items, without displaying the second reception image, and wherein the central processing unit executes the process with respect to the second reception image specified on the basis of the common item that is common to the first reception image, in accordance with the operation with respect to the first reception image.

2. The information processing system according to claim 1, wherein:

the central processing unit that displays an operation image for receiving an operation of displaying the second reception image from the user on the screen on which the first reception image is displayed, wherein the central processing unit executes, in a case where the operation with respect to the first reception image is performed, the process with respect to the second reception image without performing an operation of the user with respect to the operation image.

3. The information processing system according to claim 2, wherein the central processing unit executes, in a case where the operation with respect to the first reception image is received, a process for displaying an information image relating to the second reception image on the screen.

4. The information processing system according to claim 1, wherein the plurality of reception image are images that are created for each customer to instruct execution of a proposal process relating to proposal information relating to a product for which the customer makes a contract.

5. The information processing system according to claim 4, wherein the central processing unit sets types of the products in the reception image as the classification items, and wherein the central processing unit classifies the first reception image and the second reception image into a first classification and a second classification on the basis of the types of the products for display, and displays a selection image for selectively displaying any one of the first classification and the second classification on the screen.

6. The information processing system according to claim 1, wherein the plurality of reception image are images that are created for each customer to instruct execution of a proposal process relating to proposal information relating to a product for which the customer makes a contract.

7. The information processing system according to claim 6, wherein the central processing unit sets types of the products in the reception image as the classification items, and wherein the central processing unit classifies the first reception image and the second reception image into a first classification and a second classification on the basis of the types of the products for display, and displays a selection image for selectively displaying any one of the first classification and the second classification on the screen.

8. The information processing system according to claim 1, wherein the plurality of reception image are images that are created for each customer to instruct execution of a proposal process relating to proposal information relating to a product for which the customer makes a contract.

9. The information processing system according to claim 8, wherein the central processing unit sets types of the products in the reception image as the classification items, and wherein the central processing unit classifies the first reception image and the second reception image into a first classification and a second classification on the basis of the types of the products for display, and displays a selection image for selectively displaying any one of the first classification and the second classification on the screen.

10. The information processing system according to claim 8, wherein the central processing unit executes the process with respect to the second reception image specified on the basis of customer product information relating to the product for which the customer makes a contract.

11. The information processing system according to claim 10, wherein the customer product information is usage situation information relating to a usage situation of the product from the customer.

12. The information processing system according to claim 10, wherein the customer product information is product contract information relating to a contract of the product from the customer.

13. The information processing system according to claim 8, wherein the central processing unit creates first proposal information with respect to the first reception image and second proposal information with respect to the second reception image, in accordance with the operation with respect to the first reception image.

14. The information processing system according to claim 13, wherein the central processing unit specifies proposal information having a priority among the first proposal information and the second proposal information on the basis of customer product information on the product for which the customer makes a contract.

15. The information processing system according to claim 13, wherein the central processing unit creates combination proposal information relating to a proposal for a combination of a first product relating to the first reception image and a second product relating to the second reception image.

16. An information processing system comprising:

an image display section that includes a screen on which an image is displayed;

a central processing unit that is able to display a plurality of reception images for respectively receiving an instruction for execution of a predetermined process on the screen; and the central processing unit that specifies, in a case where an operation with respect to a first reception image among the plurality of reception images is received from a user, a second reception image associated with the first reception image, wherein the central processing unit displays the second image specified by the specification unit on the screen on which the first reception image is displayed, wherein the central processing unit that respectively sets classification items for classifying the plurality of reception images and a common item that is common between different classifications, with respect to the plurality of reception images, wherein the central processing unit displays the first reception image on the screen in accordance with classification displays based on the classification items, without displaying the second reception image, and wherein the central processing unit executes the process with respect to the second reception image specified on the basis of the common item that is common to the first reception image, in accordance with the operation with respect to the first reception image.

17. A non-transitory computer readable medium storing a program for causing a computer that functions as an information processing apparatus to execute:

a function for displaying a plurality of reception images for respectively receiving an instruction for execution of a predetermined process on a screen, and a function for executing, in a case where an operation with respect to a first reception image among the plurality of reception image is received from a user, the process with respect to a second reception image that is associated with the first reception image among the plurality of reception images and is not displayed on the screen on which the first reception image is displayed, a function for respectively setting classification items for classifying the plurality of reception images and a common item that is common between different classifications, with respect to the plurality of reception images, a function for displaying the first reception image on the screen in accordance with classification displays based on the classification items, without displaying the second reception image, and a function for executing the process with respect to the second reception image specified on the basis of the common item that is common to the first reception image, in accordance with the operation with respect to the first reception image.

\* \* \* \* \*